United States Patent
Li et al.

(10) Patent No.: US 10,123,329 B2
(45) Date of Patent: Nov. 6, 2018

(54) LONG TRAINING FIELD IN UPLINK MULTI-USER MULTIPLE-INPUT MULTIPLE-OUTPUT COMMUNICATIONS

(71) Applicant: Intel IP Corporation, Santa Clara, CA (US)

(72) Inventors: Qinghua Li, San Ramon, CA (US); Xiaogang Chen, Beijing (CN); Yuan Zhu, Beijing (CN); Robert Stacey, Portland, OR (US); Hujun Yin, Saratoga, CA (US)

(73) Assignee: Intel IP Corporation, Santa Clara, CA (US)

( * ) Notice: Subject to any disclaimer, the term of this patent is extended or adjusted under 35 U.S.C. 154(b) by 98 days.

(21) Appl. No.: 14/998,130

(22) Filed: Dec. 26, 2015

(65) Prior Publication Data
US 2017/0105215 A1    Apr. 13, 2017

Related U.S. Application Data

(60) Provisional application No. 62/238,521, filed on Oct. 7, 2015.

(51) Int. Cl.
*H04W 72/04* (2009.01)
*H04B 7/0413* (2017.01)
(Continued)

(52) U.S. Cl.
CPC ...... *H04W 72/0453* (2013.01); *H04B 7/0413* (2013.01); *H04B 7/0452* (2013.01);
(Continued)

(58) Field of Classification Search
CPC ............ H04W 72/04; H04W 72/0453; H04W 72/005; H04W 72/1284; H04W 72/1221;
(Continued)

(56) References Cited

U.S. PATENT DOCUMENTS 7,006,529 B2 *  2/2006  Alastalo ............... H04B 7/0842
                                                              370/345
7,856,068 B1   12/2010  Tung et al.
(Continued)

OTHER PUBLICATIONS

International Search Report and Written Opinion for PCT Application No. PCT/US2016/050889, dated Dec. 12, 2016, 15 pages.

*Primary Examiner* — Andrew Chriss
*Assistant Examiner* — Rasha Fayed
(74) *Attorney, Agent, or Firm* — Eversheds Sutherland (US) LLP

(57) ABSTRACT

Embodiments for long training field (LTF) sequences or other types of sequences in uplink multi-user multiple-input multiple-output communications are provided. The LTF sequences can permit channel estimation, including determination of carrier frequency offsets. In some embodiments, an LTF sequence can be formatted and/or conveyed without reliance on pilot tones. In other embodiments, the LTF sequence can rely on pilot tones, where a sequence associated with the pilot tones can include elements that are orthogonal among transmitter station devices that communicate according to MU-MIMO.

21 Claims, 11 Drawing Sheets

```
                                    ┌─ 1100

┌─ 1110
┌─────────────────────────────────────────┐
│ CONFIGURE A FIRST SEQUENCE OF SYMBOLS TO BE │
│   TRANSMITTED ON A DEFINED FIRST TONE OF A   │
│   COMMUNICATION CHANNEL, WHEREIN THE FIRST   │
│   SEQUENCE OF SYMBOLS IS ORTHOGONAL TO AT    │
│ LEAST ONE SECOND SEQUENCE OF SYMBOLS BEING   │
│    TRANSMITTED ON AT LEAST ONE RESPECTIVE    │
│      DEFINED SECOND TONE OF THE FREQUENCY    │
│                    CHANNEL                   │
└─────────────────────────────────────────┘
                    │
                    ▼             ┌─ 1120
┌─────────────────────────────────────────┐
│  SEND THE FIRST SEQUENCE TO AN ACCESS POINT  │
│    DEVICE CONFIGURED TO DETERMINE AT LEAST   │
│    ONE OF A CHANNEL ESTIMATE OR A CARRIER    │
│   FREQUENCY OFFSET USING THE FIRST SEQUENCE  │
│       AND THE AT LEAST ONE SECOND SEQUENCE   │
└─────────────────────────────────────────┘
```

(51) Int. Cl.
*H04B 7/0456* (2017.01)
*H04L 25/02* (2006.01)
*H04L 27/26* (2006.01)
*H04B 7/0452* (2017.01)

(52) U.S. Cl.
CPC ....... *H04B 7/0456* (2013.01); *H04L 25/0224* (2013.01); *H04L 27/2602* (2013.01)

(58) Field of Classification Search
CPC ......... H04W 72/1236; H04W 72/1242; H04W 72/1252; H04W 16/14; H04W 88/08; H04W 24/10; H04W 28/18; H04W 28/12; H04W 28/24; H04W 52/08; H04W 52/56; H04L 5/0048; H04L 5/0053; H04L 5/0021; H04L 5/026; H04L 5/0026; H04L 5/0023; H04L 5/02; H04L 5/04; H04L 25/02; H04L 25/0224; H04L 25/0228; H04L 25/03019; H04L 25/03; H04L 25/0226; H04L 25/0204; H04L 25/03828; H04L 27/26; H04L 27/2602; H04L 27/186; H04L 27/3416; H04L 27/2608; H04L 27/362; H04L 27/22; H04L 27/2655; H04L 27/2604; H04L 27/2662; H04L 27/2657; H04L 47/10; H04L 17/0026; H04L 17/20; H04L 1/0026; H04L 1/20; H04L 2027/0065; H04L 2027/0091; H04L 2027/0095; H04B 7/04; H04B 7/0413; H04B 7/0456; H04B 1/69; H04B 1/707; H04B 1/7107; H04B 1/692
USPC .................. 370/208, 205, 204, 439; 455/436
See application file for complete search history.

(56) References Cited

U.S. PATENT DOCUMENTS

| | | | |
|---|---|---|---|
| 2001/0047424 A1* | 11/2001 | Alastalo | H04B 7/0842 709/236 |
| 2004/0109432 A1* | 6/2004 | Laroia | H04W 52/34 370/343 |
| 2005/0058193 A1* | 3/2005 | Saed | H04L 25/03159 375/232 |
| 2006/0203710 A1 | 9/2006 | Mukkavilli et al. | |
| 2007/0087749 A1* | 4/2007 | Ionescu | H04B 7/04 455/436 |
| 2007/0149194 A1* | 6/2007 | Das | H04L 47/10 455/436 |
| 2010/0061402 A1 | 3/2010 | Van Zelst et al. | |
| 2010/0195774 A1* | 8/2010 | Lopez de Victoria | H04B 7/0848 375/343 |
| 2011/0305296 A1* | 12/2011 | Van Nee | H04L 5/0053 375/295 |
| 2012/0269124 A1* | 10/2012 | Porat | H04W 72/1231 370/328 |
| 2013/0202001 A1* | 8/2013 | Zhang | H04L 29/10 370/476 |
| 2015/0098344 A1 | 4/2015 | Niu et al. | |
| 2015/0333933 A1* | 11/2015 | Lopez de Victoria | H04L 25/0224 375/343 |
| 2016/0156750 A1* | 6/2016 | Zhang | H04L 69/22 370/338 |
| 2016/0373226 A1* | 12/2016 | Wang | H04L 5/0026 |

\* cited by examiner

LONG TRAINING FIELD IN UPLINK MULTI-USER MULTIPLE-INPUT MULTIPLE-OUTPUT COMMUNICATIONS

CROSS-REFERENCE TO RELATED APPLICATION

The present application is related to and claims priority from U.S. Provisional Patent Application No. 62/238,521, filed Oct. 7, 2015, which application is hereby incorporated by reference herein in its entirety.

BACKGROUND

Multiple-Input Multiple-Output (MIMO) technology is a wireless technology that uses multiple transmitters and receivers to transfer more data at the same time. MIMO technology takes advantage of a natural radio-wave phenomenon called multipath. With multipath, transmitted information bounces off walls, ceilings, and other objects, reaching the receiving antenna multiple times via different angles and at slightly different times. In the past, multipath caused interference and slowed down wireless signals. MIMO technology can take advantage of multipath behavior by using multiple, smart transmitters and receivers with an added spatial dimension, to dramatically increase performance and range. In order to implement MIMO, communication devices (e.g., access point devices, station devices, or the like) are configured to support MIMO. For instance, a station device (e.g., a mobile device) and/or an access point (AP) device need to support MIMO. In some scenarios, for optimal performance and range, both the station device and the AP device can support MIMO. In MIMO operation, the AP device can estimate a communication channel in the upstream link (or uplink (UL)) by using specific information (e.g., long training field (LTF) sequences) received from stations devices. The particular design for the communication of such information can determine the efficiency and/or quality of channel estimation.

BRIEF DESCRIPTION OF THE DRAWINGS

The accompanying drawings form an integral part of the disclosure and are incorporated into the present specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

The disclosure recognizes and addresses, in at least certain aspects, the issue of channel estimation, including determination of carrier frequency offsets. In some designs of LTF for UL MU-MIMO), pilot tones can be utilized for estimating carrier frequency offsets (CFOs) from different uplink user devices. Yet, in view that all the uplink user devices send the same signal on the pilot tones, reliable channel estimation may not be achieved for the pilot tones. The disclosure, in at least some embodiments, addresses such unreliability of channel estimation by removing pilot tones in UL MU-MIMO communications, without performance loss. As described in greater detail below, the disclosure provides LTF sequences and/or other types of sequences in uplink MU-MIMO communications, where the LTF sequences can permit channel estimation, including determination of carrier frequency offsets. In some embodiments, an LTF sequence can be formatted and/or conveyed without reliance on pilot tones. In other embodiments, the LTF sequence can rely on pilot tones, where a sequence associated with the pilot tones can include, for example, elements that are orthogonal among transmitter station devices that communicate according to MU-MIMO.

The disclosure provides advantages over conventional approaches to channel estimation. For example, at least some embodiments in accordance with this disclosure can improve channel estimation, particularly, yet not exclusively, in MU-MIMO communications, by removing channel interpolation. In addition or for another example, at least some embodiments in accordance with this disclosure can simplify transmitter design (e.g., hardware design, software implementations, firmware implementation, or a combination thereof) by removing pilot sequences in pilot tones that may be associated with channel estimation.

Figure 1:
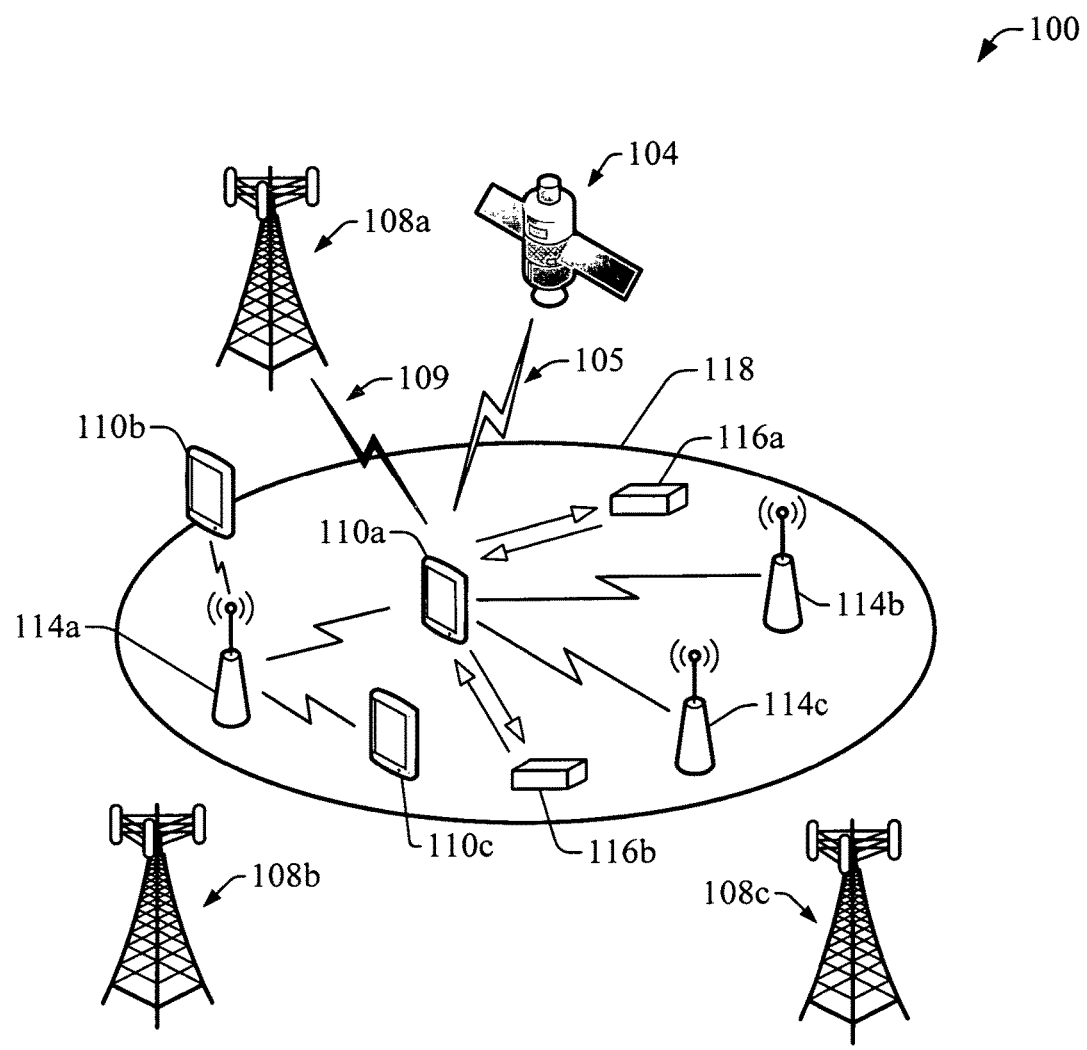
FIG. 1 illustrates an example of an operational environment for wireless communication in accordance with one or more embodiments of the disclosure.

With reference to the drawings, FIG. 1 presents a block diagram of an example operational environment 100 for wireless communication in accordance with at least certain aspects of the disclosure. The operational environment 100 includes several telecommunication infrastructures and devices, which collectively can embody or otherwise constitute a telecommunication environment. The devices can communicate wirelessly or otherwise. More specifically, yet not exclusively, the telecommunication infrastructures can include, for example, a satellite system 104. As described herein, the satellite system 104 can be embodied in or can include, for example, a global navigation satellite system (GNSS), such as the Global Positioning System (GPS), Galileo, GLONASS (Globalnaya navigatsionnaya sputnikovaya sistema), BeiDou Navigation Satellite System (BDS), and/or the Quasi-Zenith Satellite System (QZSS). In addition, the telecommunication infrastructures can include, for example, a macro-cellular or large-cell system; which is represented with three base station devices 108a-108c; a micro-cellular or small-cell system, which is represented with three access point (AP) devices (or low-power base station devices) 114a-114c; and a sensor-based system—which can include, for example, proximity sensor(s), beacon device(s), pseudo-stationary device(s), and/or wearable device(s)—represented with functional elements 116a-116b. As illustrated, in one implementation, each of the transmitter(s), receiver(s), and/or transceiver(s) included in respective computing devices (such as telecommunication infrastructure) can be functionally coupled (e.g., communicatively or otherwise operationally coupled (e.g., 105 and 109)) with the wireless device 110a (also referred to as communication device 110a) via wireless link(s) in accordance with specific radio technology protocols (e.g., IEEE 802.11a, IEEE 802.1 lax, etc.) in accordance with aspects of this disclosure. For another example, a base station device (e.g., base station device 108a) can be functionally coupled to the wireless devices 110a, 110b, and 110c via a respective upstream wireless link (UL) and a downstream link (DL) configured in accordance with a radio technology protocol for macro-cellular wireless communication (e.g., $3^{rd}$ Generation Partnership Project (3GPP) Universal Mobile Telecommunication System (UMTS) or "3G"; 3GPP Long Term Evolution (LTE), or LTE); LTE Advanced (LTE-A)). For yet another example, an access point (e.g., access point 114a) can be functionally coupled to one or more of the wireless devices 110a, 110b, or 110c via a respective UL and DL configured in accordance with a radio technology protocol for small-cell wireless communication (e.g., femtocell protocols, Wi-Fi, and the like). For still another example, a beacon device (e.g., device 116a) can be functionally coupled to the wireless device 110a with a UL-only (ULO), a DL-only, or an UL and DL, each of such wireless links (represented with open-head arrows) can be configured in accordance with a radio technology protocol for point-to-point or short-range wireless communication (e.g., Zigbee, Bluetooth, or near field communication (NFC) standards, ultrasonic communication protocols, or the like).

In the operational environment 100, the small-cell system and/or the beacon devices can be contained in a confined area 118 that can include, for example, an indoor region (e.g., a commercial facility, such as a shopping mall) and/or a spatially-confined outdoor region (such as an open or semi-open parking lot or garage). The small-cell system and/or the beacon devices can provide wireless service to a device (e.g., wireless device 110a or 110b) within the confined area 118. For instance, the wireless device 110a can handover from macro-cellular wireless service to wireless service provided by the small-cell system present within the confined area 118. Similarly, in certain scenarios, the macro-cellular system can provide wireless service to a device (e.g., the wireless device 110a) within the confined area 118.

In certain embodiments, the wireless device 110a, as well as other devices (which can communicate wirelessly or otherwise) contemplated in the present disclosure, can include electronic devices having computational resources, including processing resources (e.g., processor(s)), memory resources (memory devices (also referred to as memory), and communication resources for exchange of information within the wireless device 110a and/or with other computing devices. Such resources can have different levels of architectural complexity depending on specific device functionality. Exchange of information among computing devices in accordance with aspects of the disclosure can be performed wirelessly as described herein, and thus, in one aspect, the wireless device 110a also can be referred to as wireless communication device 110a, wireless computing device 110a, communication device 110a, or computing device 110a interchangeably. The same nomenclature considerations apply to wireless device 110b and wireless device 110c. More generally, in the present disclosure, a communication device can be referred to as a computing device and, in certain instances, the terminology "communication device" can be used interchangeably with the terminology "computing device," unless context clearly dictates that a distinction should be made. In addition, a communication device (e.g., communication device 110a or 110b or 110c) that operates according to HEW can utilize or leverage a physical layer convergence protocol (PLCP) and related PLCP protocol data units (PPDUs) in order to transmit and/or receive wireless communications. Example of the computing devices that can communicate wirelessly in accordance with aspects of the present disclosure can include, for example, desktop computers with wireless communication resources; mobile computers, such as tablet computers, smartphones, notebook computers, laptop computers with wireless communication resources, Ultrabook™ computers; gaming consoles, mobile telephones; blade computers; programmable logic controllers; near field communication devices; customer premises equipment with wireless communication resources, such as set-top boxes, wireless routers, wireless-enabled television sets, or the like; and so forth. The wireless communication resources can include, for example, radio units (also referred to as radios) having circuitry for processing of wireless signals, processor(s), memory device(s), and the like, where the radio, the processor(s), and the memory device(s) can be coupled via a bus architecture.

The computing devices included in the example operational environment 100, as well as other computing devices contemplated in the present disclosure, can implement (e.g., configure or otherwise generate) UL LTF sequences and/or other types of sequences for channel estimation and/or CFO determination in MU-MIMO wireless communications, as described herein. It should be appreciated that other functional elements (e.g., servers, routers, gateways, and the like) can be included in the operational environment 100. It should be appreciated that the elements of this disclosure in connection with UL LTF sequences and/or other types of sequences for channel estimation and/or CFO determination can be implemented in any telecommunication environment including a wireline network (e.g., a cable network, an internet-protocol (IP) network, an industrial control network, any wide area network (WAN), a local area network (LAN), a personal area network (PAN), a sensor-based network, or the like); a wireless network (e.g., a cellular network (either small-cell network or macro-cell network), a wireless WAN (WWAN), a wireless LAN (WLAN), a wireless PAN (WPAN), a sensor-based network, a satellite network, or the like); a combination thereof; or the like.

Figure 2:
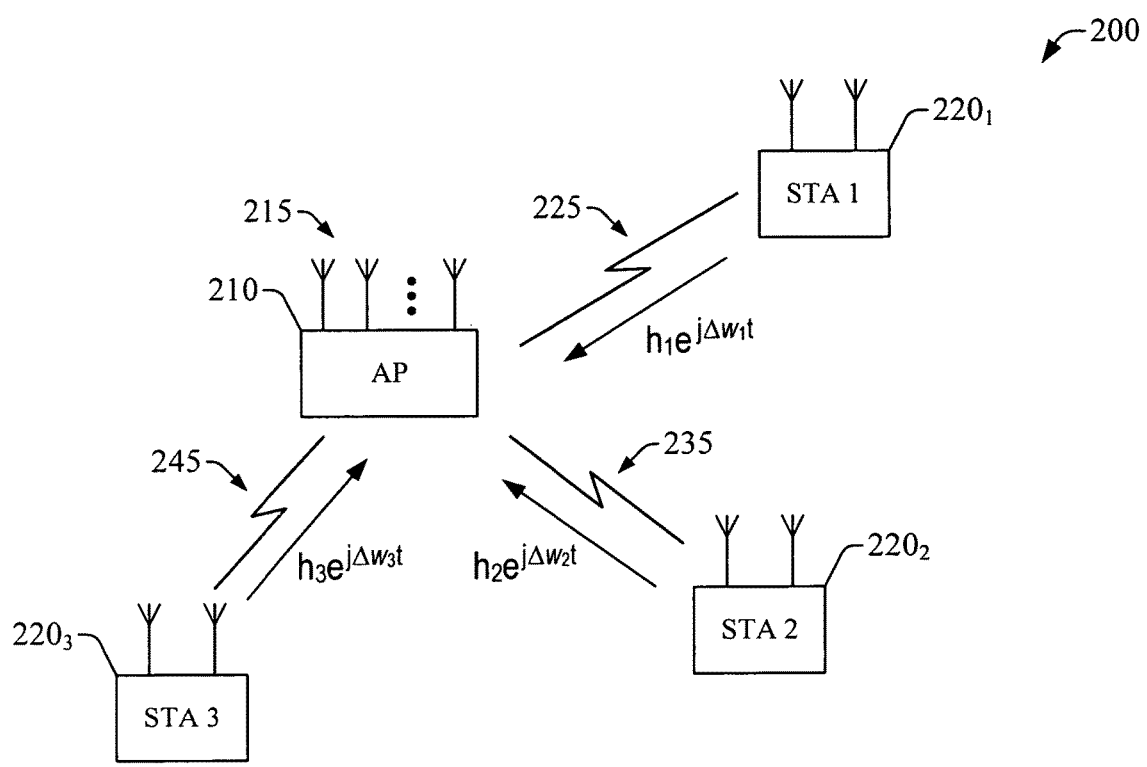
FIG. 2 illustrates an example of an operation environment for multi-user MIMO (MU-MIMO) wireless communication in accordance with one or more embodiments of the disclosure.

FIG. 2 illustrates an example of a wireless environment 200 for MU-MIMO wireless communication in accordance with one or more embodiments of the disclosure. Uplink MU-MIMO communications include one or more carrier frequency offsets. As illustrated, an AP device 210 can receive wireless signals (e.g., 225, 235, and 245) from two (or, in some embodiments, more than two) station devices, such as station device (STA) 1 220$_1$, STA 2 220$_2$, and STA 3 220$_3$, each of the station devices having at least two antennas for wireless communication. In addition, each of STA 1 220$_1$, STA 2 220$_2$, STA 3 220$_3$ can be configured to communicate according to MIMO mode. Uplink transmissions for STA 1 220$_1$ have a defined channel response h$_1$ and a defined carrier frequency offset (CFO) $\Delta\omega_1$. Similarly, uplink transmissions for STA 2 220$_2$ can have a defined channel response h$_2$ and a defined CFO $\Delta\omega_2$, and uplink transmissions for STA 3 220$_3$ can have a defined channel response $h3$ and a defined CFO $\Delta\omega_3$ In the present disclosure, in at least some embodiments, STA 1 220$_1$, STA 2 220$_2$, and STA 3 220$_3$ can each be referred to as an UL user device.

In a wireless environment, such as wireless environment 200, the CFOs can be unknown or otherwise undetermined. Thus, the AP device 210 can estimate such offsets and/or other aspects of channel estimations based at least on LTF sequences in UL MU-MIMO. In one embodiment of long training field (LTF) of UL MU-MIMO, such as the embodiment shown at FIG. 3, pilot tones and related pilot sequences can be utilized for estimating CFOs from different uplink user devices, such as STA 1 220$_1$ and STA 2 220$_2$. Specifically, in one example, a first pilot tone 305$_1$ and a first sequence of symbols 320, and a second pilot tone 305$_2$ and a second sequence of symbols 340 can be utilized in the estimation of CFOs from different UL user devices. In one aspect, in view that all (or, in some embodiments, at least some) of the uplink user devices can send the same signal on the pilot tones, reliable channel estimation cannot be obtained for the pilot tones. Therefore, channel interpolation may be necessary in order to estimate the channel, including determining CFOs.

Figure 3:
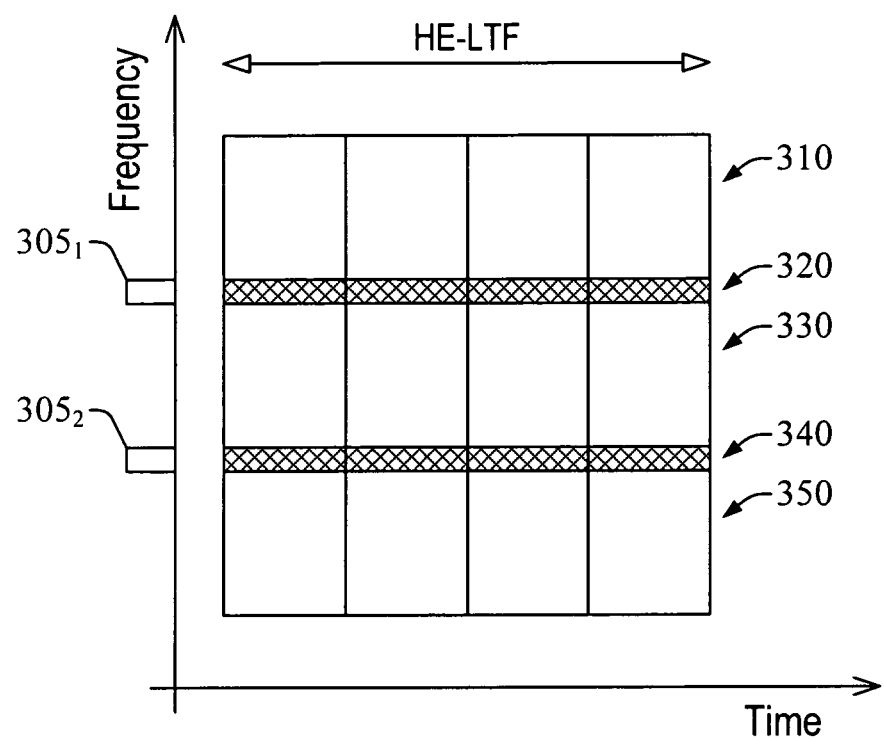
FIG. 3 illustrates an example of a High-Efficiency long training field (HE-LTF) design utilized in uplink wireless communications.

As described herein, in accordance with aspects of this disclosure, reliance or otherwise utilization of pilot tones may be avoided. In addition or in other aspects, channel estimation can be accomplished by utilizing pilot tones, each having (or otherwise conveying) sequences that are mutually orthogonal between UL user devices. As shown in FIG. 3, the CFOs (and/or other type of channel estimation) of UL user devices can be estimated from the superimposed received signals on HE-LTF symbols, such as first HE-LTF symbols 310, second symbols HE-LTF symbols 330, and third HE-LTF symbols 350. One or more subsets of the HE-LTF symbols can be encoded with respective spreading sequences associated with a P matrix, for example. More specifically, the first HE-LTF symbols 310 can be encoded with a first spread sequence defined by a first P matrix (e.g., P$_1$); the second HE-LTF symbols 330 can be encoded with a second spread sequence defined by a second P matrix (e.g., P$_2$); the third HE-LTF symbols 350 can be encoded with a third spread sequence defined by a third P matrix (e.g., P$_3$). As such, in some implementations, an initial or otherwise rough estimation of each user device's channel can be obtained by despreading a P-matrix encoding across HE-LTF symbols. Subsequently, the channels determined according to the initial estimation can be utilized to determine (e.g., compute) K unknown CFOs $\Delta\omega_1$, $\Delta\omega_2$, ... $\Delta\omega_{K-1}$, $\Delta\omega_K$ respectively associated with K user devices. To that end, the unknown CFOs can be estimated by solving N equations observed from HE-LTF symbols. Here, K is a natural indicative of a number of user devices and N is the number HE-LTF symbols transmitted across some tones. In some aspects, each of the K user devices can transmit multiple symbols. Thus, N can be greater than K, which relationship can permit estimating or otherwise determining the unknown CFOs. It is noted that, for a specific device, the phase shift associated with each HE-LTF symbol can increase linearly with time. Without intending to be bound by theory and/or modeling, such an increase can be due to the accumulation of CFO as a function of time. In other words, latter symbols can have a greater phase shift because they are transmitted at a later time.

In some embodiments, a user device's channels and respective CFOs can be estimated or otherwise determined jointly. However, such a determination can be complex. In one implementation, a rough or otherwise initial estimation of each of the user device's channel can be obtained by P-matrix despreading. In addition, using the estimated channels, K superimposed signals from K user devices can be separated by spatial demultiplexing, resulting in K streams. In one embodiment, one or more components (e.g., such as a baseband processor or circuitry) can perform the spatial demultiplexing at a receiver device. Further, using the separated signals of each user device, the CFO can be estimated by determining or otherwise evaluating a phase difference between transmitted signals at two different time instants, e.g., at two different HE-LTF symbols.

As mentioned, utilization of pilot tones that transmit the same information (e.g., a pilot sequence), can make channel interpolation generally necessary, for the pilot tones, in an estimation of the CFO and the detection of subsequent data. Regardless of channel interpolations, channel estimation and/or determination of CFOs may be accomplished as outlined hereinbefore. More importantly, in accordance with this disclosure, techniques for channel estimation and/or CFO determination do not require pilot sequences where each (or, in some embodiments at least one) user device sends the same signal. Instead, in at least some embodiments, the disclosed techniques can be applied to any tone where a respective channel of each user device can be initially estimated. While an initial estimation may be rough estimation, it may be performed at essentially any satisfactory level of accuracy, depending on available processing resources, for example. Therefore, in some embodiments, complexity can be reduced and performance can be enhanced by removing pilot tones and associated pilot sequences and the channel interpolation associated with the pilot sequences.

Figure 4:
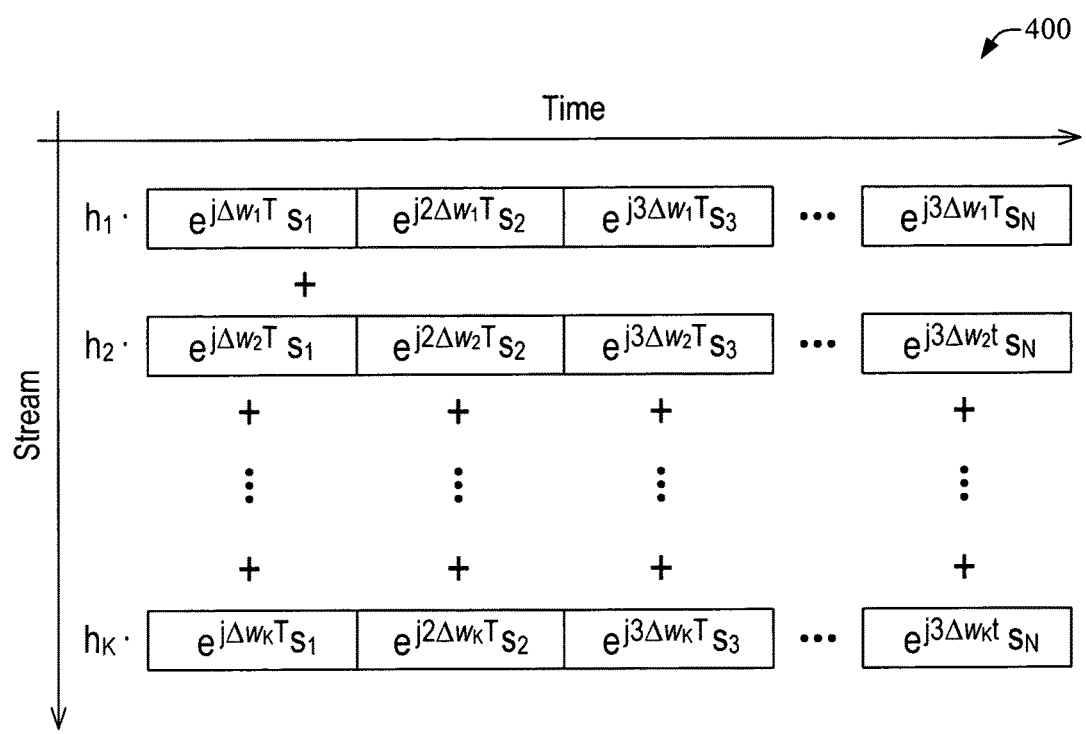
FIG. 4 illustrates an example of a model for HE-LTF symbols received at an access point device for the uplink in accordance with one or more embodiments of the disclosure.

In embodiments of this disclosure, such as the embodiments shown in FIG. 4, for a defined tone v, a signal r(i) associated with an i-th LTF symbol received from K user devices at an antenna of a receiver device (e.g., one of the antennas 215 in the AP device 210) can be represented as follows:

$$r(i) = \sum_{k=1}^{K} h_k e^{j\Delta\omega_k iT} s_k(i) + n(i) \text{ for } i = 1, \ldots, N \quad (1)$$

In Eq. (1), i is an LTF symbol index representing the i-th LTF symbol; K represents the number of user devices or, in some embodiments, streams of symbols; $\Delta\omega_k$ represents the carrier frequency offset of the k-th user device or, in some embodiments, streams; T represents the LTF symbol duration, which spans a defined amount of time determined, for example, by a radio technology protocol; $h_k$ is the channel response for the tone v; n(i) represents noise plus interference of the i-th LTF symbol; N represents the number LTF symbols that are sent by each user device or, in some embodiments, are present in each stream received at the receiver device; $s_k(i)$ is the i-th symbol transmitted by the k-th user device or, in some embodiments, that is present in the k-th stream on the tone v. As such, Equation (1) represents a set of N complex equations and, thus, 2N real equations.

The set of channel responses $\{h_k\}$ in Eq. (1) can be available, at least initially to a defined satisfactory level of accuracy, via P-matrix despreading over LTF symbols, for example. In one embodiment, one or more components (e.g., such as a baseband processor or circuitry) can perform the despreading at a receiver device. In an aspect, CFO can destroys P-matrix code orthogonality. Thus, results from P-matrix despreading can have interferences from other user devices or, in some embodiments, streams. Therefore, when each of the channel responses in the set $\{h_k\}$ is available via an initial estimation, for example, the remaining unknowns in Eq. (1) are the K real numbers $\Delta\omega_K$. Therefore, in some implementations, Eq. (1) can be represented as $$\begin{bmatrix} r(1) \\ \vdots \\ r(N) \end{bmatrix} = \begin{bmatrix} \begin{bmatrix} \Omega_1 \\ \vdots \\ \Omega_K \end{bmatrix}^T \begin{bmatrix} h_1 s_1(1) \\ \vdots \\ h_K s_K(1) \end{bmatrix} \\ \vdots \\ \begin{bmatrix} \Omega_1^N \\ \vdots \\ \Omega_K^N \end{bmatrix}^T \begin{bmatrix} h_1 s_1(N) \\ \vdots \\ h_K s_K(N) \end{bmatrix} \end{bmatrix} + \begin{bmatrix} n(1) \\ \vdots \\ n(N) \end{bmatrix} \quad (2)$$

In Eq. (2), $[\bullet]^T$ represents the transpose operation and $\Omega_K = e^{j\Delta\omega_k T}$, where $j=\sqrt{-1}$ is the imaginary unit. In addition, Eq. (2) embodies a group of non-linear equations about $\{\Omega_K\}$s. In some scenarios, the CFOs can be small below about 400 Hz. As such, $\Delta\omega_k T$ can be a small parameter which can permit linearizing, and solving, the expressions in Eq. (2) as follows:

$$\begin{bmatrix} r(1) \\ \vdots \\ r(N) \end{bmatrix} = \begin{bmatrix} \begin{bmatrix} \cos(\theta_1) + j\sin(\theta_1) \\ \vdots \\ \cos(\theta_K) + j\sin(\theta_K) \end{bmatrix}^T \begin{bmatrix} h_1 s_1(1) \\ \vdots \\ h_K s_K(1) \end{bmatrix} \\ \vdots \\ \begin{bmatrix} \cos(N\theta_1) + j\sin(N\theta_1) \\ \vdots \\ \cos(N\theta_K) + j\sin(N\theta_K) \end{bmatrix}^T \begin{bmatrix} h_1 s_1(N) \\ \vdots \\ h_K s_K(N) \end{bmatrix} \end{bmatrix} + \begin{bmatrix} n(1) \\ \vdots \\ n(N) \end{bmatrix} \quad (3)$$

$$\approx \begin{bmatrix} \begin{bmatrix} 1-\theta_1+j\theta_1 \\ \vdots \\ 1-\theta_K+j\theta_K \end{bmatrix}^T \begin{bmatrix} \hat{h}_1 s_1(1) \\ \vdots \\ \hat{h}_K s_K(1) \end{bmatrix} \\ \vdots \\ \begin{bmatrix} 1-N\theta_1+jN\theta_1 \\ \vdots \\ 1-N\theta_K+jN\theta_K \end{bmatrix}^T \begin{bmatrix} \hat{h}_1 s_1(N) \\ \vdots \\ \hat{h}_K s_K(N) \end{bmatrix} \end{bmatrix} + \begin{bmatrix} n(1) \\ \vdots \\ n(N) \end{bmatrix}$$

$$= C_0 + A_0 \begin{bmatrix} \theta_1 \\ \vdots \\ \theta_K \end{bmatrix} + \begin{bmatrix} n(1) \\ \vdots \\ n(N) \end{bmatrix}$$

In Eq. (3), $[\bullet]^T$ represents the transpose operation and $\theta_k = \Delta\omega_k T$, with k=1, 2, ... K, is the phase rotation within an LTF symbol of user device (e.g., STA 1 220$_1$ or STA 2 220$_2$) or, in some embodiments, stream k; $\hat{h}_k$ is the estimate of channel response $h_k$. In addition, $C_0$ is a vector independent of the unknown $\{\theta_K\}$s. Further, $A_0$ is a matrix that also is independent of the unknown $\{\theta_K\}$s and can be expressed as follows:

$$A_0 = \begin{bmatrix} \left( -\begin{bmatrix} \text{Re}(\hat{h}_1 s_1(1))+\text{Im}(\hat{h}_1 s_1(1)) \\ \vdots \\ \text{Re}(\hat{h}_K s_K(1))+\text{Im}(\hat{h}_K s_K(1)) \end{bmatrix} + j \begin{bmatrix} \text{Re}(\hat{h}_1 s_1(1))-\text{Im}(\hat{h}_1 s_1(1)) \\ \vdots \\ \text{Re}(\hat{h}_K s_K(1))-\text{Im}(\hat{h}_K s_K(1)) \end{bmatrix} \right)^T \\ 2\left( -\begin{bmatrix} \text{Re}(\hat{h}_1 s_1(2))+\text{Im}(\hat{h}_1 s_1(2)) \\ \vdots \\ \text{Re}(\hat{h}_K s_K(2))+\text{Im}(\hat{h}_K s_K(2)) \end{bmatrix} + j \begin{bmatrix} \text{Re}(\hat{h}_1 s_1(2))-\text{Im}(\hat{h}_1 s_1(2)) \\ \vdots \\ \text{Re}(\hat{h}_K s_K(2))-\text{Im}(\hat{h}_K s_K(2)) \end{bmatrix} \right)^T \\ \vdots \\ N\left( -\begin{bmatrix} \text{Re}(\hat{h}_1 s_1(N))+\text{Im}(\hat{h}_1 s_1(N)) \\ \vdots \\ \text{Re}(\hat{h}_K s_K(N))+\text{Im}(\hat{h}_K s_K(N)) \end{bmatrix} + j \begin{bmatrix} \text{Re}(\hat{h}_1 s_1(N))-\text{Im}(\hat{h}_1 s_1(N)) \\ \vdots \\ \text{Re}(\hat{h}_K s_K(N))-\text{Im}(\hat{h}_K s_K(N)) \end{bmatrix} \right)^T \end{bmatrix} \quad (4)$$

Several features emerge or otherwise can be gleaned from Eq. (4): (A) In scenarios in which $A_0$ is rank deficient, Eq. (3) cannot be solved. Specifically, the respective CFOs of the K user devices cannot be estimated from the signals received on each individual antenna of an AP device (e.g., each of antennas 215 of AP device 210) using the first order approximation of the non-linear expressions in Eq. (2). In such scenario, the CFOs have to be estimated from all receive antennas jointly. As an illustration, $A_0$ can have rank equal to 1 when all user devices or streams send the same training sequence on the pilot tones; namely, $s_1(i)=s_2(i)=\ldots=s_K(i)$ for i=1, 2 ... N.

(B) In scenarios in which the training sequences are orthogonal with one another among user devices or, in some embodiments, streams, $A_0$ is full-rank and can permit solving the CFOs utilizing the approach described herein. In other words, when the columns of $A_0$ are orthogonal, the CFOs (or $\{\theta_K\}$s) can be determined.

(C) While pilot tones are not needed in the LTF symbols, it is noted that in some embodiments, pilot tones may preferred or otherwise desired. In at least some of such embodiments, aspects of this disclosure can permit optimizing the training sequences on the pilot tones.

Figure 5:
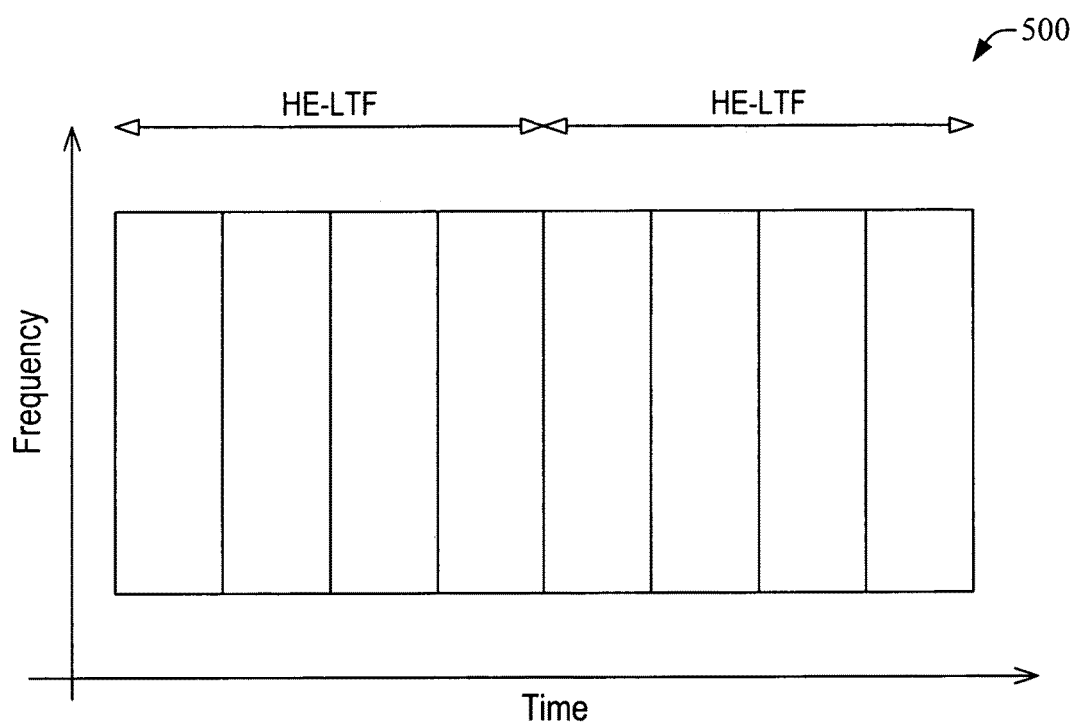
FIG. 5 illustrates an example of uplink LTF in accordance with one or more embodiments of this disclosure.

In order to perform channel estimation, including determining CFOs, some embodiments may include masking sequences in frequency domain, where the masking sequences of different user devices (or, in some embodiments, streams) can be mutually orthogonal. In accordance with this disclosure, a transmitter device (e.g., STA 1 220$_1$ transmitting UL in MU-MIMO) can configure or otherwise format a LTF sequence or another type of sequence to include a mask. In one embodiment, one or more components (e.g., such as a baseband processor or circuitry) can perform the masking of the LTF sequence at a transmitter device. A factor that may determine the inclusion of masking is peak-to-average-power ratio (PAPR). Therefore, depending on criteria associated with masking, additional or alternative embodiments may avoid relying on masking. More specifically, the following illustrates embodiments that can permit implementations without masking sequences. First Example Embodiments: No Pilots and No Masking Sequences.—Masking sequences are mainly for the ease of CFO estimation (e.g., simplification of computations for determining CFO(s) at a receiver device (e.g., AP device 210)). In scenarios in which computational complexity, or computational cost, is not a limiting factor in the operation of the receiver device, masking sequences can be removed. In addition or in some implementations, pilot tones may not be used or otherwise relied upon because a CFO can be estimated from any tone that transports or otherwise conveys information, without limitation to pilot tones. FIG. 5 illustrates an example of an uplink LTF design 500 in which pilot tones are absent and masking sequences are avoided. In the example design 500, symbols for a group of user devices are transmitted in respectively allocated tones.

Figure 6:
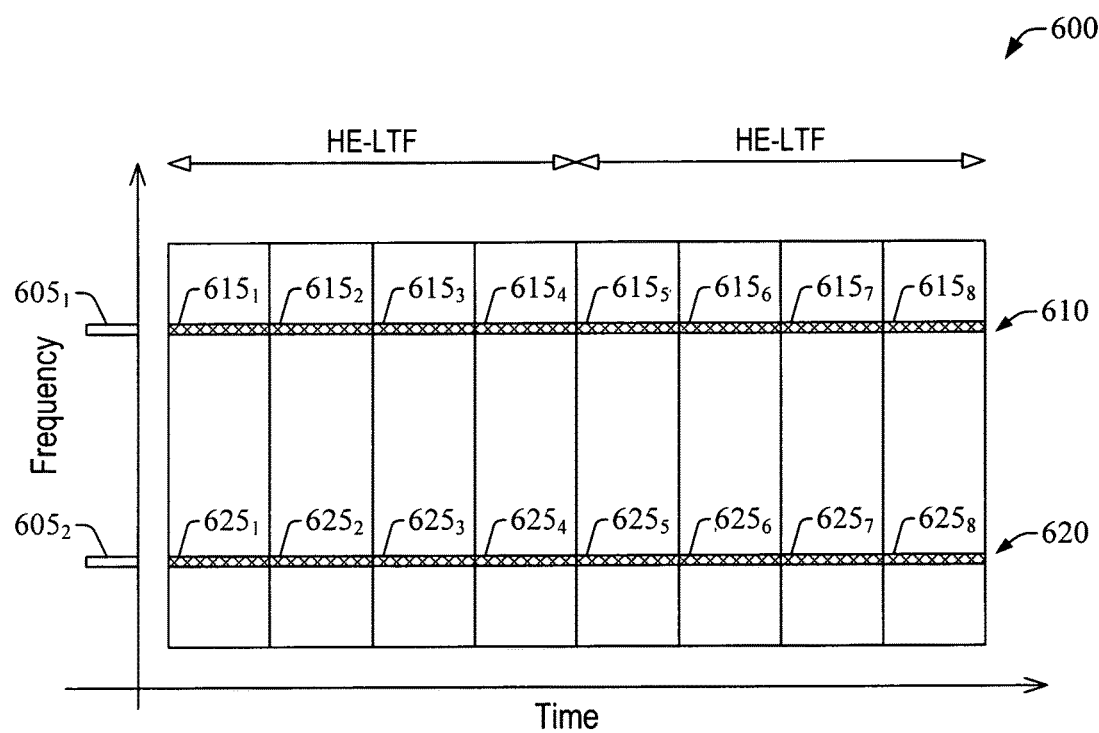
FIG. 6 illustrates another example of uplink LTF in accordance with one or more embodiments of this disclosure.

Second Example Embodiments: Pilots with Satisfactory Sequences.—As mentioned, masking sequences can be included for the computational simplification of CFO estimation, and, as such, they can be removed when computational complexity is not an implementation consideration. In addition, computational simplification of the CFO estimation, and in some embodiments, pilot tones with satisfactory sequences (e.g., optimized sequences or nearly-optimized sequences) may be implemented or otherwise leveraged. In some aspects, training sequences on pilot tones may be optimized for CFO estimation and the training sequences on the other tones may be optimized for channel estimation. More specifically, as it can be gleaned from Eqs. (4) and (3), the phases $$\begin{bmatrix} \theta_1 \\ \vdots \\ \theta_K \end{bmatrix}$$

can increase linearly with time as LTF symbols are subsequently transmitted, from the 1st, 2nd, . . . , to the Nth. Implementation (e.g., design, generation, and/or transmission) of training sequences on pilot tones, e.g., $s_l(i)$s, with $l=1, 2 \ldots K$, in Eqs. (3) and (4), and linear magnification or increase of such phases can be considered. For example, in order to maximize orthogonality among received training sequences—e.g., the columns of matrix $A_0$—the training sequences on the pilot tones may have sequentially decreasing magnitudes $1, 1/2, 1/3, \ldots, 1/N$ on respective HE-LTF symbols sequentially. More specifically, in one embodiment, a training sequence on a pilot tone may be selected from the rows or columns of an orthogonal matrix, such as a P matrix or a Hadamard matrix, and the magnitudes of each element in the selected training sequence can be weighted by decreasing coefficients (e.g., real numbers) having amplitudes $1, 1/2, 1/3, \ldots, 1/N$, where N is the length of a selected sequence. More generally, Eq. (4) can provide guidance regarding selections of weights. It is noted that such amplitudes can decrease according to other functions besides a hyperbola $1/x$. FIG. 6 schematically illustrates an example of an UL LTF sequence for N=8, including a first pilot tone 605$_1$ and a second pilot tone 605$_2$. The first pilot tone 605$_1$ can transport or otherwise convey a first pilot sequence 610 having eight symbols: $s_1$ 615$_1$, $s_2$ 615$_2$, $s_3$ 615$_3$, $s_4$ 615$_4$, $s_5$ 615$_5$, $s_6$ 615$_6$, $s_7$ 615$_7$, $s_8$ 615$_8$. The second pilot tone 605$_2$ can transport or otherwise convey a second pilot sequence 620 having eight other symbols: $s'_1$ 625$_1$; $s'_2$ 625$_2$, $s'_3$ 625$_3$, $s'_4$ 625$_4$, $s'_5$ 625$_5$, $s'_6$ 625$_6$, $s'_7$ 625$_7$, $s'_8$ 625$_8$. The first pilot sequence 610 and the second pilot sequence 620 are mutually orthogonal, in accordance with aspects described herein.

Figure 7:
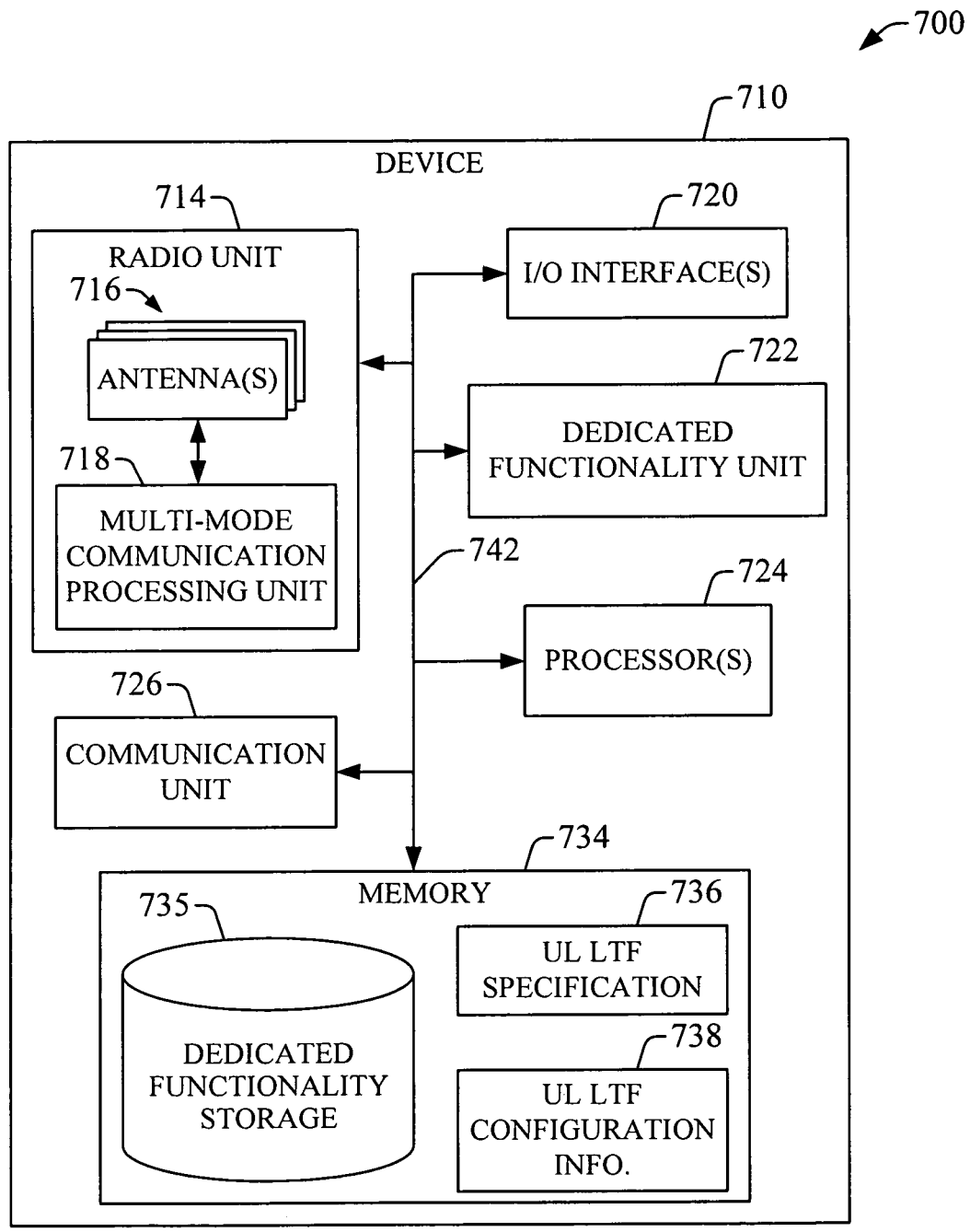
FIG. 7 presents an example of a communication device for wireless communication in accordance with one or more embodiments of the disclosure.

FIG. 7 illustrates a block-diagram of an example embodiment 700 of a device 710 that can operate in accordance with at least certain aspects of the disclosure. The exemplified device 710 can include a communication device and can operate in accordance with at least some aspects of the disclosure, implementing UL LTFs as described herein, for example. Accordingly, in some embodiments, the device 710 can embody or can constitute any one of devices in the operational environment 100, such as one of the AP devices 114*a*, 114*b*, or 114*c*, or one of the other illustrated devices. Thus, in some aspects, the device 710 can provide one or more specific functionalities—such as operating as a gateway device, a router device, or a sensor hub device; operating as a digital camera and generating digital images (e.g., static pictures and/or motion pictures); operating as a navigation device; operating as a biometric device (e.g., a heart rate monitor, a pressure monitor, a glucometer, an iris analyzer, a fingerprint analyzer, etc.); dosing and delivering an amount of a drug or other compound; operating as a sensor and sensing a defined physical quantity, such as temperature and/or pressure, or motion; operating as another sensor and sensing a compound in gas phase or liquid phase; operating as a controller for configuring a second defined physical quantity, managing energy, managing access to an environment, managing illumination and/or sound, regulating a defined process, such an automation control process, or the like; generating current, voltage, or other type of signal via inductive coils; a combination of the foregoing; a derivative functionality of the foregoing; or the like. To that end, the device 710 can include one or more functionality units 722 (referred to as dedicated functionality unit 722) that can include optical elements (e.g., lenses, collimators, light guides, light sources, light detectors (such as semiconductor light detectors), focusing circuitry, etc.); temperature sensors; pressure sensors; gas sensors; motion sensors, including inertial sensors (such as linear accelerator and/or a gyroscope); mechanical actuators (such as locks, valves, and the like); a combination of the foregoing; or the like.

In addition or in other aspects, a specific functionality of the device 710 can be provided or otherwise implemented via one or more processors 724. In some implementations, at least one of the processor(s) 724 can be integrated with dedicated functionality unit 722. In some implementations, at least one of the processor(s) (e.g., one or more of the processor(s) 724 or other processor(s)) can receive and operate on data and/or other types of information (e.g., analog signals) generated by components of the dedicated functionality unit 722. The at least one processor can execute a module in order to operate on the data and/or others type of information and, as a result, provide a defined functionality. The module can be embodied in or can include, for example, a software application stored in a memory device integrated into or functionally coupled to the device. For instance, the module can be retained in one or more memory devices 735 (collectively referred to as dedicated functionality storage 735), where the dedicated functionality storage 735 can be retained within one or more other memory devices 734 (collectively referred to as memory 734). In addition or in other implementations, at least a second one of the processor(s) (e.g., one or more of processor(s) 724 or other processor(s) available to the dedicated functionality unit 722) can control the operation or duty cycle of a portion of the dedicated functionality unit 722 so as to collect data and/or other types of information; provide an amount (or a dose) of a compound or acquire another amount of another compound or material; a combination of the foregoing; or the like. At least one of the units that constitute the dedicated functionality unit 722 can generate control signals (e.g., interruptions, alarms, or the like) and/or can cause the device 710 to transition between operational states in response to a defined condition of the device 710 or its environment. At least some of the control signals can be sent to an external device (not depicted in FIG. 7) via an I/O interface of the I/O interfaces 720. The type and/or number of components included in the dedicated functionality unit 722 can establish, at least in part, the complexity of the device 710. In some examples, the device 710 can embody or can constitute an AP device, and in other examples, the device 710 can embody or can constitute a SED or another type of IoT device.

The device 710 also can operate as a wireless device and, as mentioned, the device 710 can embody or can constitute an access point device, a mobile computing device (e.g., user equipment or station device), or other types of communication devices (e.g., CPE) that can transmit and/or receive wireless communications in accordance with this disclosure. Accordingly, in some embodiments, the device 710 can embody or can constitute any one of devices in the operational environment 100. For example, the device 710 can embody or can constitute the AP device 210 or at least one of the stations STA 1 220$_1$ or STA 2 220$_2$. In some aspects, to permit wireless communication, including providing (e.g., configuring and/or transmitting) UL LTFs in MU-MIMO communications as described herein, the device 710 includes a radio unit 714 and a communication unit 726. In certain implementations, the communication unit 726 can generate packets or other types of information blocks via a network stack, for example, and can convey the packets or other types of information block to the radio unit 714 for wireless communication. In one embodiment, the network stack (not shown) can be embodied in or can constitute a library or other types of programming module, and the communication unit 726 can execute the network stack in order to generate a packet or other types of information block. Generation of the packet or the information block can include, for example, generation of control information (e.g., checksum data, communication address(es)), traffic information (e.g., payload data), and/or formatting of such information into a specific packet header.

As illustrated in FIG. 7, the radio unit 714 can include one or more antennas 716 and a multi-mode communication processing unit 718. In certain embodiments, the antenna(s) 716 can be embodied in or can include, for example, directional or omnidirectional antennas, including, for example, dipole antennas, monopole antennas, patch antennas, loop antennas, microstrip antennas or other types of antennas suitable for transmission of RF signals. In addition, or in other embodiments, at least some of the antenna(s) 716 can be physically separated to leverage spatial diversity and related different channel characteristics associated with such diversity. In addition or in other embodiments, the multi-mode communication processing unit 718 that can process at least wireless signals in accordance with one or more radio technology protocols and/or modes (such as multiple-input multiple-output (MIMO), single-input multiple-output (SIMO), multiple-input single-output (MISO), and the like. Each of such protocol(s) can be configured to communicate (e.g., transmit, receive, or exchange) data, metadata, and/or signaling over a specific air interface. The one or more radio technology protocols can include 3GPP UMTS; LTE; LTE-A; Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth or ZigBee; other protocols for packetized wireless communication; or the like). The multi-mode communication processing unit 718 also can process non-wireless signals (analogic, digital, a combination thereof, or the like).

Figure 8:
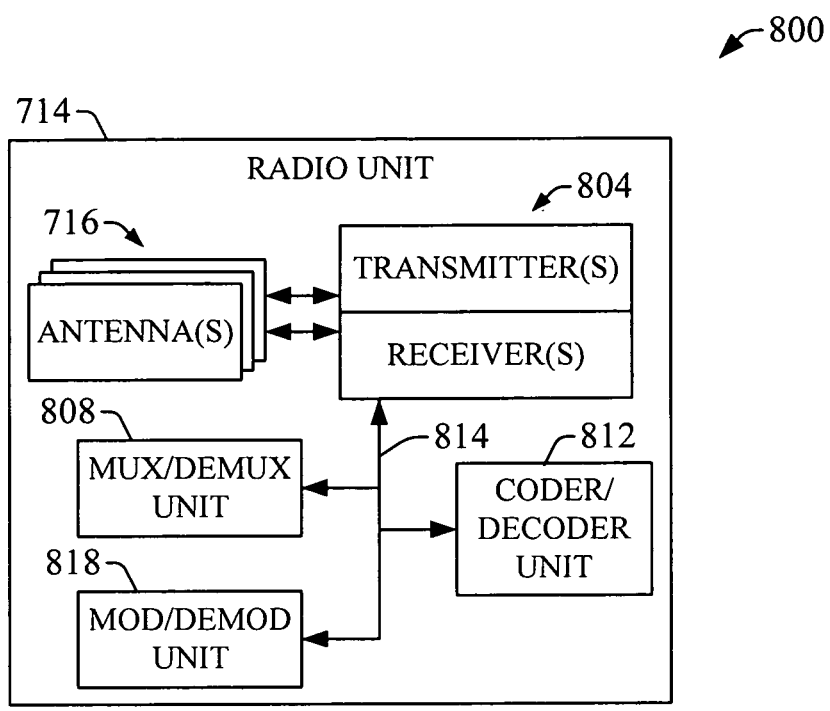
FIG. 8 presents an example of a radio unit for wireless communication in accordance with one or more embodiments of the disclosure.

In one embodiment, e.g., example embodiment 800 shown in FIG. 8, the radio unit 714 can comprise a set of one or more transmitters/receivers 804, and components therein (amplifiers, filters, analog-to-digital (A/D) converters, etc.), functionally coupled to a multiplexer/demultiplexer (mux/demux) unit 808, a modulator/demodulator (mod/demod) unit 818 (also referred to as modem 818), and a coder/decoder unit 812 (also referred to as codec 812). Each of the transmitter(s)/receiver(s) can form respective transceiver(s) that can transmit and receive wireless signal (e.g., electromagnetic radiation) via the one or more antennas 716. It should be appreciated that in other embodiments, the multi-mode communication processing unit 718 can include, for example, other functional elements, such as one or more sensors, a sensor hub, an offload engine or unit, a combination thereof, or the like. While illustrated as separate blocks in the device 710, it should be appreciated that in certain embodiments, at least a portion of the multi-mode communication processing unit 718 and the communication unit 726 can be integrated into a single unit (e.g., a single chipset or other type of solid state circuitry). In one aspect, such a unit can be configured by programmed instructions retained in the memory 734 and/or other memory devices integrated into or functionally coupled to the unit.

Electronic components and associated circuitry, such as mux/demux unit 808, codec 812, and modem 818 can permit or facilitate processing and manipulation, e.g., coding/decoding, deciphering, and/or modulation/demodulation, of signal(s) received by the device 710 and signal(s) to be transmitted by the device 710. In one aspect, as described herein, received and transmitted wireless signals can be modulated and/or coded, or otherwise processed, in accordance with one or more radio technology protocols. Such radio technology protocol(s) can include 3GPP UMTS; 3GPP LTE; LTE-A; Wi-Fi protocols, such as IEEE 802.11 family of standards (IEEE 802.ac, IEEE 802.ax, and the like); WiMAX; radio technologies and related protocols for ad hoc networks, such as Bluetooth or ZigBee; other protocols for packetized wireless communication; or the like.

The electronic components in the described communication unit, including the one or more transmitters/receivers 804, can exchange information (e.g., data, metadata, code instructions, signaling and related payload data, combinations thereof, or the like) through a bus 814, which can embody or can comprise at least one of a system bus, an address bus, a data bus, a message bus, a reference link or interface, a combination thereof, or the like. Each of the one or more receivers/transmitters 804 can convert signals from analog to digital and vice versa. In addition or in the alternative, the receiver(s)/transmitter(s) 804 can divide a single data stream into multiple parallel data streams, or perform the reciprocal operation. Such operations may be conducted as part of various multiplexing schemes. As illustrated, the mux/demux unit 808 is functionally coupled to the one or more receivers/transmitters 804 and can permit processing of signals in time and frequency domain. In one aspect, the mux/demux unit 808 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, the mux/demux unit 808 can scramble and spread information (e.g., codes) according to most any code, such as Hadamard-Walsh codes, Baker codes, Kasami codes, polyphase codes, and the like. The modem 818 can modulate and demodulate information (e.g., data, metadata, signaling, or a combination thereof) according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like). In addition, processor(s) that can be included in the device 710 (e.g., processor(s) included in the radio unit 714 or other functional element(s) of the device 710) can permit processing data (e.g., symbols, bits, or chips) for multiplexing/demultiplexing, modulation/demodulation (such as implementing direct and inverse fast Fourier transforms), selection of modulation rates, selection of data packet formats, inter-packet times, and the like.

The codec 812 can operate on information (e.g., data, metadata, signaling, or a combination thereof) in accordance with one or more coding/decoding schemes suitable for communication, at least in part, through the one or more transceivers formed from respective transmitter(s)/receiver(s) 804. In one aspect, such coding/decoding schemes, or related procedure(s), can be retained as a group of one or more computer-accessible instructions (computer-readable instructions, computer-executable instructions, or a combination thereof) in one or more memory devices 734 (referred to as memory 734). In a scenario in which wireless communication among the device 710 and another computing device (e.g., a station or other types of user equipment) utilizes MIMO, MISO, SIMO, or SISO operation, the codec 812 can implement at least one of space-time block coding (STBC) and associated decoding, or space-frequency block (SFBC) coding and associated decoding. In addition or in the alternative, the codec 812 can extract information from data streams coded in accordance with spatial multiplexing schemes. In one aspect, to decode received information (e.g., data, metadata, signaling, or a combination thereof), the codec 812 can implement at least one of computation of log-likelihood ratios (LLRs) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 812 can utilize, at least in part, mux/demux unit 808 and mod/demod unit 818 to operate in accordance with aspects described herein.

With further reference to FIG. 7, the device 710 can operate in a variety of wireless environments having wireless signals conveyed in different electromagnetic radiation (EM) frequency bands. To at least such end, the multi-mode communication processing unit 718 in accordance with aspects of the disclosure can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion(s) of the EM spectrum. In one aspect, the set of one or more frequency bands can include at least one of (i) all or most licensed EM frequency bands, (such as the industrial, scientific, and medical (ISM) bands, including the 2.4 GHz band or the 5 GHz bands); or (ii) all or most unlicensed frequency bands (such as the 60 GHz band) currently available for telecommunication.

The device 710 can receive and/or transmit information encoded and/or modulated or otherwise processed in accordance with aspects of the present disclosure. To at least such an end, in certain embodiments, the device 710 can acquire or otherwise access information wirelessly via the radio unit 714 (also referred to as radio 714), where at least a portion of such information can be encoded and/or modulated in accordance with aspects described herein. As illustrated, in certain embodiments, the device 710 can include one or more memory elements 736 (referred to UL LTF specification 736) that can include, for example, information defining or otherwise specifying a format for MU-MIMO uplink LTF sequences and/or other type of sequences that can be utilized for channel estimation in accordance with aspects of this disclosure. In addition or in other embodiments, the UL LTF specification 736 can specify instructions and/or other information (e.g., data, such as parameters (e.g., scaling factors) and/or signaling) for implementation (e.g., configuration, generation, and/or transmission) of MU-MIMO uplink LTF and/or other type of sequences for channel estimation, as described herein. In addition, the device 710, via the communication unit 726, for example, can implement UL LTF sequences and/or other types of sequences for channel estimation and/or CFO determination according to instructions or other information retained in one or more memory elements 738 (referred to as UL LTF configuration information 738).

The memory 734 can contain one or more memory elements having information suitable for processing information received according to a predetermined communication protocol (e.g., IEEE 802.11ac or IEEE 802.11ax). While not shown, in certain embodiments, one or more memory elements of the memory 734 can include, for example, computer-accessible instructions that can be executed by one or more of the functional elements of the device 710 in order to implement at least some of the functionality for implementation of UL LTF sequences and/or other types of sequences for channel estimation and/or CFO determination in wireless communication in accordance with aspects described herein. One or more groups of such computer-accessible instructions can embody or can constitute a programming interface that can permit communication of information (e.g., data, metadata, and/or signaling) between functional elements of the device 710 for implementation of such functionality.

As illustrated, the device 710 can include one or more I/O interfaces 720. At least one of the I/O interface(s) 720 can permit the exchange of information between the device 710 and another computing device and/or a storage device. Such an exchange can be wireless (e.g., via near field communication or optically-switched communication) or wireline. At least another one of the I/O interface(s) 720 can permit presenting information visually, aurally, and/or via movement to an end-user of the device 710. In one example, a haptic device can embody the I/O interface of the I/O interface(s) 720 that permit conveying information via movement. In addition, in the illustrated device 710, a bus architecture 742 (also referred to as bus 742) can permit the exchange of information (e.g., data, metadata, and/or signaling) between two or more functional elements of the device 710. For instance, the bus 742 can permit exchange of information between two or more of (i) the radio unit 714 or a functional element therein, (ii) at least one of the I/O interface(s) 720, (iii) the communication unit 726, or (iv) the memory 734. In addition, one or more application programming interfaces (APIs) (not depicted in FIG. 7) or other types of programming interfaces can permit the exchange of information (e.g., data and/or metadata) between two or more of the functional elements of the device 710. At least one of such API(s) can be retained or otherwise stored in the memory 734. In certain embodiments, it should be appreciated that at least one of the API(s) or other programming interfaces can permit the exchange of information within components of the communication unit 726. The bus 742 also can permit a similar exchange of information. In certain embodiments, the bus 742 can embody or can include at least one of a system bus, an address bus, a data bus, a message bus, a reference link or interface, a combination thereof, or the like. In addition or in other embodiments, the bus 742 can include, for example, components for wireline and wireless communication.

It should be appreciated that portions of the device 710 can embody or can constitute an apparatus. For instance, the multi-mode communication processing unit 718, the communication unit 726, and at least a portion of the memory 734 can embody or can constitute an apparatus that can operate in accordance with one or more aspects of this disclosure.

Figure 9:
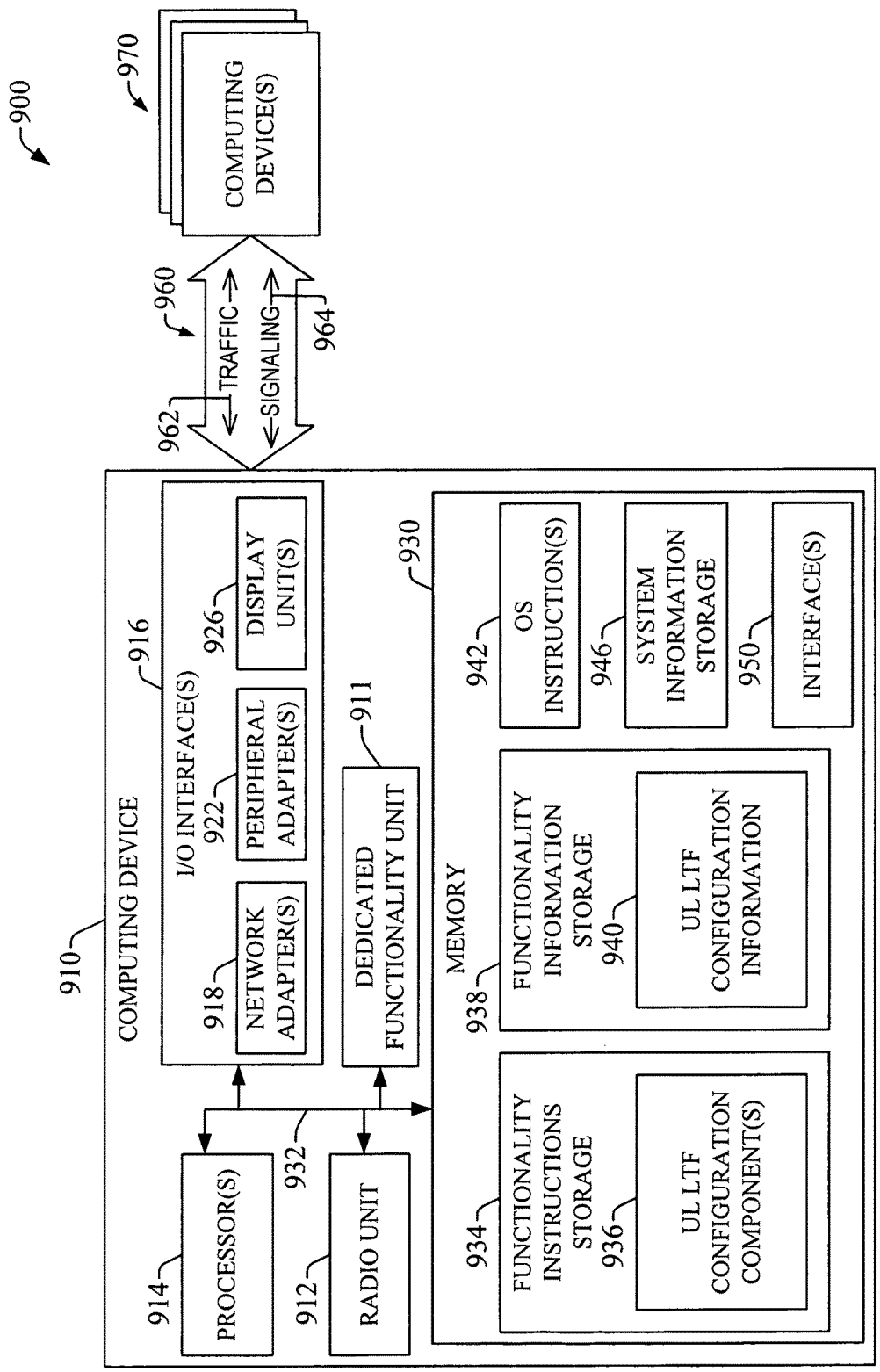
FIG. 9 presents an example of a computational environment for wireless communication in accordance with one or more embodiments of the disclosure.

FIG. 9 illustrates an example of a computational environment 900 for wireless communication in accordance with one or more aspects of the disclosure. The example computational environment 900 is only illustrative and is not intended to suggest or otherwise convey any limitation as to the scope of use or functionality of such computational environments' architecture. In addition, the computational environment 900 should not be interpreted as having any dependency or requirement relating to any one or combination of components illustrated in this example computational environment. The illustrative computational environment 900 can embody or can include, for example, the computing device 710, one or more of the base stations 114a, 114b, or 114c, AP 210 and/or any other computing devices (e.g., STA 1 220₁, STA 2 220₂, device 110a, device 110b, and/or device 710) that can implement or otherwise leverage the elements described herein in connection with MU-MIMO UL LTF sequences and/or other types of sequences for channel estimation, including determination of CFOs.

The computational environment 900 represents an example of a software implementation of the various aspects or features of the disclosure in which the processing or execution of operations described in connection with the implementation of MU-MIMO UL LTF sequences and/or other types of sequences for channel estimation and/or CFO determination in wireless communications in accordance with aspects described herein can be performed in response to execution of one or more software components at the computing device 910. It should be appreciated that the one or more software components can render the computing device 910, or any other computing device that contains such components, a particular machine for implementation (e.g., configuration, generation, and/or transmission) in wireless communication in accordance with aspects described herein, among other functional purposes. A software component can be embodied in or can comprise one or more computer-accessible instructions, e.g., computer-readable and/or computer-executable instructions. At least a portion of the computer-accessible instructions can embody one or more of the example techniques disclosed herein. For instance, to embody one such method, at least the portion of the computer-accessible instructions can be persisted (e.g., stored, made available, or stored and made available) in a computer storage non-transitory medium and executed by a processor. The one or more computer-accessible (or processor-accessible) instructions that embody a software component can be assembled into one or more program modules, for example, that can be compiled, linked, and/or executed at the computing device 910 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 910 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the elements of implementation of MU-MIMO UL LTF sequences and/or other types of sequences for channel estimation, including CFO determination, can comprise personal computers; server computers; laptop devices; handheld computing devices, such as mobile tablets; wearable computing devices; and multiprocessor systems. Additional examples can include set top boxes, programmable consumer electronics, network PCs, minicomputers, mainframe computers, blade computers, programmable logic controllers, distributed computing environments that comprise any of the above systems or devices, and the like.

As illustrated, the computing device 910 can comprise one or more processors 914, one or more input/output (I/O) interfaces 916, a memory 930, and a bus architecture 932 (also termed bus 932) that functionally couples various functional elements of the computing device 910. As illustrated, the computing device 910 also can include a radio unit 912. In one example, similarly to the radio unit 714, the radio unit 912 can include one or more antennas and a communication processing unit that can permit wireless communication between the computing device 910 and another device, such as one of the computing device(s) 970. The bus 932 can include at least one of a system bus, a memory bus, an address bus, or a message bus, and can permit exchange of information (data, metadata; and/or signaling) between the processor(s) 914, the I/O interface(s) 916, and/or the memory 930, or respective functional element therein. In certain scenarios, the bus 932 in conjunction with one or more internal programming interfaces 950 (also referred to as interface(s) 950) can permit such exchange of information. In scenarios in which processor(s) 914 include multiple processors, the computing device 910 can utilize parallel computing.

The I/O interface(s) 916 can permit or otherwise facilitate communication of information between the computing device and an external device, such as another computing device, e.g., a network element or an end-user device. Such communication can include, for example, direct communication or indirect communication, such as exchange of information between the computing device 910 and the external device via a network or elements thereof. As illustrated, the I/O interface(s) 916 can comprise one or more of network adapter(s) 918, peripheral adapter(s) 922, and display unit(s) 926. Such adapter(s) can permit or facilitate connectivity between the external device and one or more of the processor(s) 914 or the memory 930. In one aspect, at least one of the network adapter(s) 918 can couple functionally the computing device 910 to one or more computing devices 970 via one or more traffic and signaling pipes 960 that can permit or facilitate exchange of traffic 962 and signaling 964 between the computing device 910 and the one or more computing devices 970. Such network coupling provided at least in part by the at least one of the network adapter(s) 918 can be implemented in a wired environment, a wireless environment, or both. Therefore, it should be appreciated that in certain embodiments, the functionality of the radio unit 912 can be provided by a combination of at least one of the network adapter(s) 918 and at least one of the processor(s) 914. Accordingly, in such embodiments, the radio unit 912 may not be included in the computing device 910. The information that is communicated by the at least one network adapter can result from implementation of one or more operations in a method of the disclosure. Such output can be any form of visual representation, including, but not limited to, textual, graphical, animation, audio, tactile, and the like. In certain scenarios, each of the computing device(s) 970 can have substantially the same architecture as the computing device 910. In addition or in the alternative, the display unit(s) 926 can include functional elements (e.g., lights, such as light-emitting diodes; a display, such as liquid crystal display (LCD), combinations thereof, or the like) that can permit control of the operation of the computing device 910, or can permit conveying or revealing operational conditions of the computing device 910.

In one aspect, the bus 932 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, Universal Serial Bus (USB), and the like. The bus 932, and all buses described herein can be implemented over a wired or wireless network connection and each of the subsystems, including the processor(s) 914, the memory 930 and memory elements therein, and the I/O interface(s) 916 can be contained within one or more remote computing devices 970 at physically separate locations, connected through buses of this form, in effect implementing a fully distributed system.

The computing device 910 can comprise a variety of computer-readable media. Computer readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 910, and can comprise, for example, both volatile and non-volatile media, and removable and/or non-removable media. In one aspect, the memory 930 can comprise computer-readable media in the form of volatile memory, such as random access memory (RAM), and/or non-volatile memory, such as read only memory (ROM).

The memory 930 can comprise functionality instructions storage 934 and functionality information storage 938. The functionality instructions storage 934 can comprise computer-accessible instructions that, in response to execution (by at least one of the processor(s) 914), can implement one or more of the functionalities of the disclosure. The computer-accessible instructions can embody or can comprise one or more software components illustrated as UL LTF configuration component(s) 936. In one scenario, execution of at least one component of the UL LTF configuration component(s) 936 can implement one or more of the techniques disclosed herein. For instance, such execution can cause a processor that executes the at least one component to carry out a disclosed example method. It should be appreciated that, in one aspect, a processor of the processor(s) 914 that executes at least one of the UL LTF configuration component(s) 936 can retrieve information from or retain information in a memory element 940 in the functionality information storage 938 in order to operate in accordance with the functionality programmed or otherwise configured by the UL LTF configuration component(s) 936. Such information can include at least one of code instructions, information structures, or the like. At least one of the one or more interfaces 950 (e.g., application programming interface(s)) can permit or facilitate communication of information between two or more components within the functionality instructions storage 934. The information that is communicated by the at least one interface can result from implementation of one or more operations in a method of the disclosure. In certain embodiments, one or more of the functionality instructions storage 934 and the functionality information storage 938 can be embodied in or can comprise removable/non-removable, and/or volatile/non-volatile computer storage media.

At least a portion of at least one of the UL LTF configuration component(s) 936 or UL LTF configuration information 940 can program or otherwise configure one or more of the processors 914 to operate at least in accordance with the functionality described herein. One or more of the processor(s) 914 can execute at least one of such components and leverage at least a portion of the information in the storage 938 in order to provide MU-MIMO UL LTF sequences and/or other types of sequences for channel estimation, including CFO determination, in accordance with one or more aspects described herein. More specifically, yet not exclusively, execution of one or more of the component(s) 936 can permit transmitting and/or receiving information at the computing device 910, where the at least a portion of the information can include, for example, data indicative of inclusion or exclusion pilot tones in implementation (e.g., generation and/or formatting) of MU-MIMO UL sequences for channel estimation and/or CFO determination; orthogonal sequences for pilot sequences and associated weights; definitions of one or more of $A_0$ or $C_0$ matrices; models for noise, which can define vectors (n(1), n(2), . . . n(N)); a combination thereof; or the like, in accordance with aspects of this disclosure. As such, it should be appreciated that in certain embodiments, a combination of the processor(s) 914, the UL LTF configuration component(s) 936, and the UL LTF configuration information 940 can form means for providing specific functionality for implementation of UL LTF sequences and/or other sequences for channel estimation, including determination of CFOs, in MU-MIMO wireless communications in accordance with one or more aspects of the disclosure.

It should be appreciated that, in certain scenarios, the functionality instruction(s) storage 934 can embody or can comprise a computer-readable non-transitory storage medium having computer-accessible instructions that, in response to execution, cause at least one processor (e.g., one or more of processor(s) 914) to perform a group of operations comprising the operations or blocks described in connection with the disclosed techniques for implementation of MU-MIMO UL LTF sequences and/or other types of sequences for channel estimation, including determination of CFOs, such as the example method 1100 presented in FIG. 11.

In addition, the memory 930 can comprise computer-accessible instructions and information (e.g., data and/or metadata) that permit or facilitate operation and/or administration (e.g., upgrades, software installation, any other configuration, or the like) of the computing device 910. Accordingly, as illustrated, the memory 930 can comprise a memory element 942 (labeled OS instruction(s) 942) that contains one or more program modules that embody or include one or more OSs, such as Windows operating system, Unix, Linux, Symbian, Android, Chromium, and substantially any OS suitable for mobile computing devices or tethered computing devices. In one aspect, the operational and/or architecture complexity of the computing device 910 can dictate a suitable OS. The memory 930 also comprises a system information storage 946 having data and/or metadata that permits or facilitate operation and/or administration of the computing device 910. Elements of the OS instruction(s) 942 and the system information storage 946 can be accessible or can be operated on by at least one of the processor(s) 914.

It should be recognized that while the functionality instructions storage 934 and other executable program components, such as the operating system instruction(s) 942, are illustrated herein as discrete blocks, such software components can reside at various times in different memory components of the computing device 910, and can be executed by at least one of the processor(s) 914. In certain scenarios, an implementation of the UL LTF configuration component(s) 936 can be retained on or transmitted across some form of computer readable media.

The computing device 910 and/or one of the computing device(s) 970 can include a power supply (not shown), which can power up components or functional elements within such devices. The power supply can be a rechargeable power supply, e.g., a rechargeable battery, and it can include one or more transformers to achieve a power level suitable for operation of the computing device 910 and/or one of the computing device(s) 970, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 918) to connect operationally to the conventional power grid. In another aspect, the power supply can include an energy conversion component, such as a solar panel, to provide additional or alternative power resources or autonomy for the computing device 910 and/or one of the computing device(s) 970.

The computing device 910 can operate in a networked environment by utilizing connections to one or more remote computing devices 970. As an illustration, a remote computing device can be a personal computer, a portable computer, a server, a router, a network computer, a peer device or other common network node, and so on. As described herein, connections (physical and/or logical) between the computing device 910 and a computing device of the one or more remote computing devices 970 can be made via one or more traffic and signaling pipes 960, which can comprise wireline link(s) and/or wireless link(s) and several network elements (such as routers or switches, concentrators, servers, and the like) that form a PAN, a LAN, a WAN, a WPAN, a WLAN, and/or a WWAN. Such networking environments are conventional and commonplace in dwellings, offices, enterprise-wide computer networks, intranets, local area networks, and wide area networks.

It should be appreciated that portions of the computing device 910 can embody or can constitute an apparatus. For instance, at least one of the processor(s) 914; at least a portion of the memory 930, including a portion of the UL LTF configuration component(s) 936 and a portion of the UL LTF configuration information 940; and at least a portion of the bus 932 can embody or can constitute an apparatus that can operate in accordance with one or more aspects of this disclosure.

Figure 10:
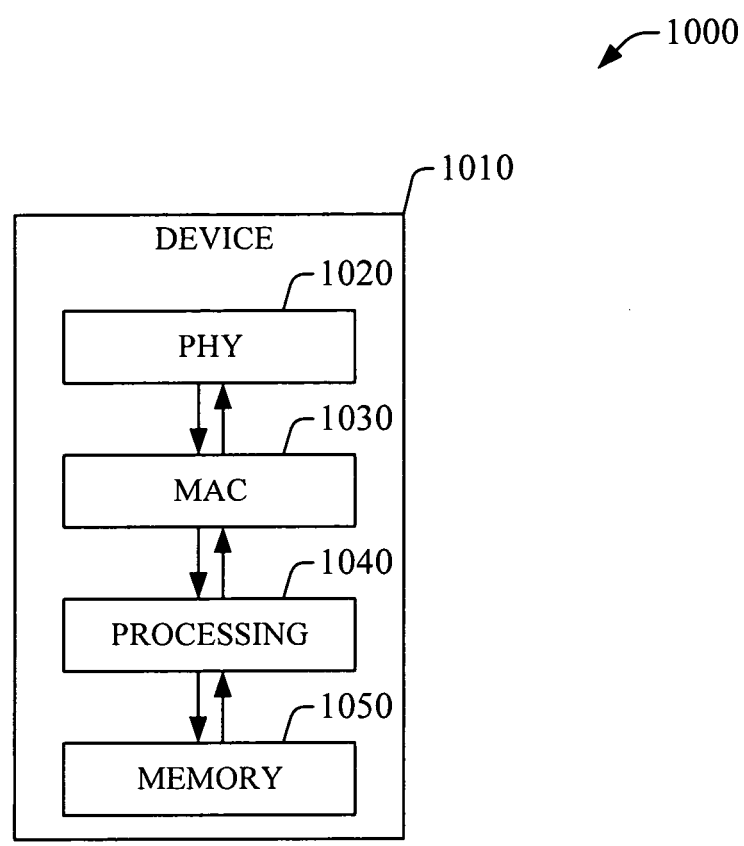
FIG. 10 presents another example of a communication device for wireless communication in accordance with one or more embodiments of the disclosure.

FIG. 10 presents another example embodiment 1000 of a device 1010 in accordance with one or more embodiments of the disclosure. The device 1010 can embody or can include, for example, one of the communication devices 110a, 110b, 110c, STA 1 $220_1$, or STA 2 $220_2$; one or more of the base stations 114a, 114b, 114c, AP 210; and/or any other computing device (e.g., device 710) that implements or otherwise leverages the elements described herein in connection with MU-MIMO UL LTF sequences and/or other types of sequences for channel estimation, including determination of CFOs. In certain embodiments, the communication device 1010 can be a HEW-compliant device that may be configured to communicate with one or more other HEW devices and/or other types of communication devices, such as legacy communication devices. HEW devices and legacy devices also may be referred to as HEW stations (HEW STAs) and legacy STAs, respectively. In one implementation, the communication device 1010 can operate as an access point (such as AP 114a, 114b, or 114c). As illustrated, the communication device 1010 can include, among other things, physical layer (PHY) circuitry 1020 and medium-access-control (MAC) layer circuitry 1030. In one aspect, the PHY circuitry 1020 and the MAC circuitry 1030 can be HEW compliant layers and also can be compliant with one or more legacy IEEE 802.11 standards. In one aspect, the MAC circuitry 1030 can be arranged to configure physical layer converge protocol (PLCP) protocol data units (PPDUs) and arranged to transmit and receive PPDUs, among other things. In addition or in other embodiments, the communication device 1010 also can include other hardware processing circuitry 1040 (e.g., one or more processors) and one or more memory devices 1050 configured to perform the various operations described herein.

In certain embodiments, the MAC circuitry 1030 can be arranged to contend for a wireless medium during a contention period to receive control of the medium for the HEW control period and configure an HEW PPDU. In addition or in other embodiments, the PHY circuitry 1020 can be arranged to transmit the HEW PPDU. The PHY circuitry 1020 can include circuitry for modulation/demodulation, upconversion/downconversion, filtering, amplification, etc. As such, the communication device 1010 can include a transceiver to transmit and receive data such as HEW PPDU. In certain embodiments, the hardware processing circuitry 1040 can include one or more processors. The hardware processing circuitry 1040 can be configured to perform functions based on instructions being stored in a memory device (e.g., RAM or ROM) or based on special purpose circuitry. In certain embodiments, the hardware processing circuitry 1040 can be configured to perform one or more of the functions described herein, such as allocating bandwidth or receiving allocations of bandwidth.

In certain embodiments, one or more antennas may be coupled to or included in the PHY circuitry 1020. The antenna(s) can transmit and receive wireless signals, including transmission of HEW packets or other type of radio packets. As described herein, the one or more antennas can include one or more directional or omnidirectional antennas, including dipole antennas, monopole antennas, patch antennas, loop antennas, microstrip antennas or other types of antennas suitable for transmission of RF signals. In scenarios in which MIMO communication is utilized, the antennas may be physically separated to leverage spatial diversity and the different channel characteristics that may result.

The memory 1050 can retain or otherwise store information for configuring the other circuitry to perform operations for configuring and transmitting HEW packets or other types of radio packets, and performing the various operations described herein including, for example, implementation (e.g., configuration, generation, and/or transmission) of MU-MIMO UL LTF sequences and/or other types of sequences for channel estimation, including determination of CFOs, in accordance with one or more embodiments of this disclosure.

The communication device 1010 can be configured to communicate using OFDM communication signals over a multicarrier communication channel. More specifically, in certain embodiments, the communication device 1010 can be configured to communicate in accordance with one or more specific radio technology protocols, such as the IEEE family of standards including IEEE 802.11, IEEE 802.11n, IEEE 802.11ac, IEEE 802.11ax, DensiFi, and/or proposed specifications for WLANs. In one of such embodiments, the communication device 1010 can utilize or otherwise rely on symbols having a duration that is four times the symbol duration of IEEE 802.11n and/or IEEE 802.11ac. It should be appreciated that the disclosure is not limited in this respect and, in certain embodiments, the communication device 1010 also can transmit and/or receive wireless communications in accordance with other protocols and/or standards.

The communication device 1010 can be embodied in or can constitute a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as IEEE 802.11 or IEEE 802.16, or other types of communication device that may receive and/or transmit information wirelessly. Similarly to the computing device 910, the communication device 1010 can include, for example, one or more of a keyboard, a display, a non-volatile memory port, multiple antennas, a graphics processor, an application processor, speakers, and other mobile device elements. The display may be an LCD screen including a touch screen.

It should be appreciated that while the communication device 1010 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In certain embodiments, the functional elements may refer to one or more processes operating or otherwise executing on one or more processors. It should further be appreciated that portions of the communication device 1010 can embody or can constitute an apparatus. For instance, the processing circuitry 1040 and the memory 1050 can embody or can constitute an apparatus that can operate in accordance with one or more aspects of this disclosure. The apparatus also can include functional elements (e.g., a bus architecture and/or API(s) as described herein) that can permit exchange of information between the processing circuitry 1040 and the memory 1050.

In view of the aspects described herein, various techniques for implementing UL LTF sequences and/or other types of sequences for channel estimation, including determination of CFOs, in MU-MIMO wireless communications by devices that can communicate wirelessly according to different communication protocols can be implemented in accordance with the disclosure. One example of such techniques can be better appreciated with reference, for example, to the flowchart in FIG. 11. For purposes of simplicity of explanation, the example method disclosed herein is presented and described as a series of blocks (with each block representing an action or an operation in a method, for example). However, it is to be understood and appreciated that the disclosed method is not limited by the order of blocks and associated actions or operations, as some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the techniques of the disclosure can be retained on an article of manufacture, or computer-readable medium, to permit or facilitate transporting and transferring such methods to a computing device (e.g., a desktop computer; a mobile computer, such as a tablet, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed techniques, can be employed to execute code instructions retained in a memory, or any computer- or machine-readable medium, to implement the one or more methods. The code instructions can provide a computer-executable or machine-executable framework to implement the techniques described herein.

Figure 11:
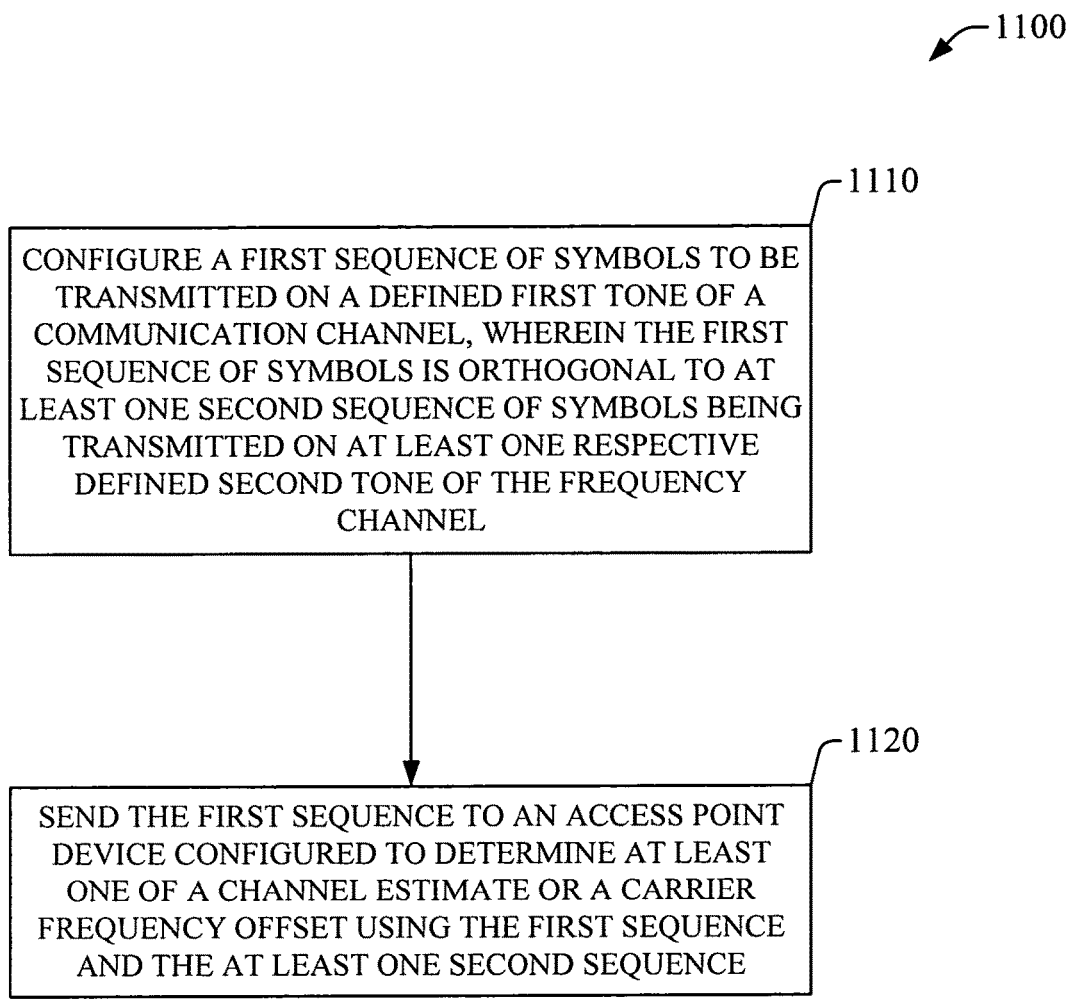
FIG. 11 presents an example method for MU-MIMO uplink LTF sequences and/or other types of sequences in accordance with one or more embodiments of the disclosure.

FIG. 11 presents a flowchart of an example method 1100 for configuration of UL LTF of other type of sequences of MU-MIMO communications in accordance with one or more embodiments of the present disclosure. A communication device (e.g., a station) in accordance with aspects of the disclosure can implement (e.g., execute) the subject example method in its entirety or in part. For example, the device 710, the computing device 910, or the communication device 1010 can implement one or more blocks of the subject example method. It should be appreciated that, in some implementations, the communication device can operate as a transmitter device (or a transmitter) when implementing the subject example method.

While illustrated with reference to a communication device, it should be appreciated that the example method 1100 also can be implemented by other types of apparatuses or devices in accordance with one or more aspects of the present disclosure. For example, one of such apparatuses can include at least one memory device having programmed instructions encoded thereon and at least one processor functionally coupled to the at least one memory and configured to execute the programmed instructions, where in response to execution of the programmed instructions, the at least one processor can perform one or more blocks of the example method 1100. For another example, another one of such apparatuses can include circuitry assembled in a chipset (such as an ASIC or another type of processor) configured to implement (e.g., execute) at least the operations described in the example method 1100.

At block 1110, the communication device (e.g., STA $220_2$ or device 110b) or a component therein can configure a first sequence of symbols to be transmitted on a defined first tone of a frequency channel. In one aspect, the first sequence of symbols can be orthogonal to at least one second sequence of symbols being transmitted on at least one respective defined second tones of the frequency channel. At block 1120, the communication device or a component therein can send the first sequence to an access point device configured to determine at least one of a channel estimate or a carrier frequency offset using the first sequence and the at least one second sequence.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read only memory (ROM); random access memory (RAM); magnetic disk storage media; optical storage media; flash memory, etc.

Embodiments of the operational environments and techniques (procedures, methods, processes, and the like) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

In example embodiments of the disclosure, there may be an apparatus. The apparatus may include at least one memory device having programmed instructions. The apparatus may include at least one processor functionally coupled to the at least one memory device and configured to execute the programmed instructions, and in response to execution of the programmed instructions, the at least one processor is further configured at least to configure a first sequence of symbols to be transmitted on a defined first tone of a frequency channel, wherein the first sequence of symbols is associated with a long training sequence, and wherein the first sequence of symbols is orthogonal to each of at least one second sequence of symbols being transmitted on respective at least one defined second tone of the frequency channel. The apparatus may include send the first sequence of symbols to an access point device configured to determine at least one of a channel estimate or a carrier frequency offset using the first sequence of symbols and the at least one second sequences of symbols.

Implementations may include one or more of the following features. The frequency channel comprises a communication channel having a defined spectral bandwidth, and wherein the defined first tone comprises a first pilot tone of the communication channel, and wherein a tone of the respective at least one second tone comprises a second pilot tone of the communication channel. The at least one processor is further configured to encode a symbol of the first sequence of symbols, the symbol comprising a matrix element of an orthogonal matrix multiplied by a defined weight coefficient. The at least one processor is further configured to encode a second symbol of the first sequence of symbols, the second symbol comprising a second matrix element of the orthogonal matrix multiplied by a second defined weight coefficient, the defined weight coefficient being greater than the second defined weight coefficient. The at least one processor is further configured to encode a second symbol of a sequence of the at least one second sequence of symbols, the second symbol comprising a second matrix element of a second orthogonal matrix multiplied by a second defined weight coefficient. The at least one processor is further configured to encode a symbol of the first sequence of symbols, the symbol comprising a matrix element of one of a P matrix or a Hadamard matrix multiplied by a defined weight coefficient. The at least one processor is further configured to encode a second symbol of the first sequence of symbols, the second symbol comprising a second matrix element of one of the P matrix or the Hadamard matrix multiplied by a second defined weight coefficient, the defined weight coefficient being greater than the second defined weight coefficient. The at least one processor is further configured to encode a second symbol of a sequence of the at least one second sequence of symbols, the second symbol comprising a second matrix element of one of a second P matrix or a second Hadamard matrix multiplied by a second defined weight coefficient. The radio unit is configured to receive a wireless signal according to a defined radio communication protocol. The apparatus is further comprised of an antenna functionally coupled to the radio unit.

According to example embodiments of the disclosure, there may be least one computer-readable memory device having instructions encoded thereon that, in response to execution, cause at least one processor to perform operations. The operations may include configuring a first sequence of symbols to be transmitted on a defined first tone of a frequency channel, wherein the first sequence of symbols is associated with a long training sequence, and wherein the sequence of symbols is orthogonal to each of at least one second sequence of symbols being transmitted on respective defined second tones of the frequency channel. The operations may include sending the first sequence to an access point device configured to determine at least one of a channel estimate or a carrier frequency offset using the first sequence and the multiple second sequences.

Implementations may include one or more of the following features. The defined first tone is a first pilot tone, and wherein at least one of the respective second tones is a second pilot tone. The configuring comprises encoding a symbol of the first sequence of symbols according to a matrix element of an orthogonal matrix multiplied by a defined weight. The encoding comprises encoding the symbol of the first sequence of symbols according to a matrix element of an Hadamard matrix multiplied by the defined weight. The encoding comprises encoding the symbol of the first sequence of symbols according to a matrix element of a P matrix multiplied by the defined weight. The defined weight is less than a second defined weight associated with a second symbol of the first sequence of symbols, the second symbol being configured to be transmitted earlier than the symbol.

According to example embodiments of the disclosure, there may be a device. The device may include at least one memory that stores computer-executable instructions, and at least one processor of the one or more processors configured to access the at least one memory, wherein the at least one processor of the one or more processors is configured to execute the computer-executable instructions to symbols being transmitted on respective defined second tones of the frequency channel. The at least one processor of the one or more processors may be configured to execute the computer-executable instructions to send the first sequence to an access point device configured to determine at least one of a channel estimate or a carrier frequency offset using the first sequence and the multiple second sequences.

The implementations may include one or more of the following features. The defined first tone is a first pilot tone, and wherein at least one of the respective second tones is a second pilot tone. The circuitry is further configured to encode a symbol of the first sequence of symbols according to a matrix element of an orthogonal matrix multiplied by a defined weight. The orthogonal matrix is selected from a group including a P matrix and a Hadamard matrix. The defined weight is less than a second defined weight associated with a second symbol of the first sequence of symbols, the second symbol being configured to be transmitted earlier than the symbol.

In example embodiments of the disclosure, there may be a method. The method may include configuring a first sequence of symbols to be transmitted on a defined first tone of a frequency channel, wherein the first sequence of symbols is associated with a long training sequence, and wherein the first sequence of symbols is orthogonal to each of at least one second sequence of symbols being transmitted on respective at least one defined second tone of the frequency channel, and sending the first sequence of symbols to an access point device configured to determine at least one of a channel estimate or a carrier frequency offset using the first sequence of symbols and the at least one second sequences of symbols.

Implementations may include one or more of the following features. The frequency channel comprises a communication channel having a defined spectral bandwidth, and wherein the defined first tone comprises a first pilot tone of the communication channel, and wherein a tone of the respective at least one second tone comprises a second pilot tone of the communication channel. The method may further include encoding a symbol of the first sequence of symbols, the symbol comprising a matrix element of an orthogonal matrix multiplied by a defined weight coefficient. The method may further include encoding a second symbol of the first sequence of symbols, the second symbol comprises a second matrix element of the orthogonal matrix multiplied by a second defined weight coefficient, the defined weight coefficient being greater than the second defined weight coefficient. The method may further include encoding a second symbol of a sequence of the at least one second sequence of symbols, the second symbol comprises a second matrix element of a second orthogonal matrix multiplied by a second defined weight coefficient. The method may further include encoding a symbol of the first sequence of symbols, the symbol comprises a matrix element of one of a P matrix or a Hadamard matrix multiplied by a defined weight coefficient. The method may further include encoding a second symbol of the first sequence of symbols, the second symbol comprises a second matrix element of the one of the P matrix or the Hadamard matrix multiplied by a second defined weight coefficient, the defined weight coefficient being greater than the second defined weight coefficient. The method may further include encoding a second symbol of a sequence of the at least one second sequence of symbols, the second symbol, comprises a second matrix element of one of a second P matrix or a second Hadamard matrix multiplied by a second defined weight coefficient.

As used in this application, the terms "component," "environment," "system," "architecture," "interface," "unit," "engine," "platform," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "interface," "unit," "engine," "platform," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that provide long training field (LTF) sequences or other sequences in uplink MU-MIMO for channel estimation, including determination of carrier frequency offsets. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. An apparatus for wireless telecommunication, comprising:
    at least one memory device having programmed instructions; and
    at least one processor functionally coupled to the at least one memory device and configured to execute the programmed instructions, and in response to execution of the programmed instructions, the at least one processor is further configured at least to:
        configure a first sequence of symbols to be transmitted on a defined first tone of a frequency channel and encode the first sequence of symbols, the first sequences of symbols comprising matrix elements of an orthogonal matrix multiplied by decreasing weight coefficients, wherein the first sequence of symbols is associated with a long training field sequence, and wherein the first sequence of symbols is orthogonal to each of at least one second sequence of symbols being transmitted on respective at least one defined second tone of the frequency channel; and
        cause to send the first sequence of symbols to an access point device configured to determine at least one of a channel estimation or a carrier frequency offset using the first sequence of symbols and the at least one second sequence of symbols.

2. The apparatus of claim 1, wherein the frequency channel comprises a communication channel having a defined spectral bandwidth, and wherein the defined first tone comprises a first pilot tone of the communication channel, and wherein a tone of the respective at least one second tone comprises a second pilot tone of the communication channel.

3. The apparatus of claim 1, wherein the at least one processor is further configured to encode a symbol of the first sequence of symbols, the symbol comprising a matrix element of the orthogonal matrix multiplied by a defined weight coefficient.

4. The apparatus of claim 3, wherein the at least one processor is further configured to encode a second symbol of the first sequence of symbols, the second symbol comprises a second matrix element of the orthogonal matrix multiplied by a second defined weight coefficient, the defined weight coefficient being greater than the second defined weight coefficient.

5. The apparatus of claim 3, wherein the at least one processor is further configured to encode a second symbol of a sequence of the at least one second sequence of symbols, the second symbol comprises a second matrix element of a second orthogonal matrix multiplied by a second defined weight coefficient.

6. The apparatus of claim 1, wherein the at least one processor is further configured to encode a symbol of the first sequence of symbols, the symbol comprises a matrix element of one of a P matrix or a Hadamard matrix multiplied by a defined weight coefficient.

7. The apparatus of claim 6, wherein the at least one processor is further configured to encode a second symbol of the first sequence of symbols, the second symbol comprises a second matrix element of the one of the P matrix or the Hadamard matrix multiplied by a second defined weight coefficient, the defined weight coefficient being greater than the second defined weight coefficient.

8. The apparatus of claim 6, wherein the at least one processor is further configured to encode a second symbol of a sequence of the at least one second sequence of symbols, the second symbol comprises a second matrix element of one of a second P matrix or a second Hadamard matrix multiplied by a second defined weight coefficient.

9. The apparatus of claim 1, further comprising a radio unit configured to receive wireless signal according to a define radio communication protocol.

10. The apparatus of claim 9, further comprising one or more antennas functionally coupled to the radio unit.

11. At least one computer-readable memory device having instructions encoded thereon that, in response to execution, cause at least one processor to perform operations comprising:
    configuring a first sequence of symbols to be transmitted on a defined first tone of a frequency channel and encoding the first sequence of symbols, the first sequences of symbols comprising matrix elements of an orthogonal matrix multiplied by decreasing weight coefficients, wherein the first sequence of symbols is associated with a long training field sequence, and wherein the first sequence of symbols is orthogonal to each of at least one second sequence of symbols being transmitted on respective defined second tones of the frequency channel; and
    sending the first sequence of symbols to an access point device configured to determine at least one of a channel estimation or a carrier frequency offset using the first sequence of symbols and the at least one second sequence of symbols.

12. The at least one computer-readable memory device of claim 11, wherein the defined first tone is a first pilot tone, and wherein at least one of the respective second tones is a second pilot tone.

13. The at least one computer-readable memory device of claim 12, wherein the configuring comprises encoding a symbol of the first sequence of symbols according to a matrix element of an orthogonal matrix multiplied by a defined weight.

14. The at least one computer-readable memory device of claim 13, wherein the encoding comprises encoding the symbol of the first sequence of symbols according to a matrix element of an Hadamard matrix multiplied by the defined weight.

15. The at least one computer-readable memory device of claim 13, wherein the encoding comprises encoding the symbol of the first sequence of symbols according to a matrix element of a P matrix multiplied by the defined weight.

16. The at least one computer-readable memory device of claim 13, wherein the defined weight is less than a second defined weight associated with a second symbol of the first sequence of symbols, the second symbol being configured to be transmitted earlier than the symbol.

17. A device, comprising:
first circuitry that configures a first sequence of symbols to be transmitted on a defined first tone of a frequency channel, wherein the first sequence of symbols is associated with a long training sequence and encodes the first sequence of symbols, the first sequences of symbols comprising matrix elements of an orthogonal matrix multiplied by decreasing weight coefficients, and wherein the first sequence of symbols is orthogonal to each of at least one second sequence of symbols being transmitted on respective defined second tones of the frequency channel; and
second circuitry that sends the first sequence to an access point device configured to determine at least one of a channel estimate or a carrier frequency offset using the first sequence and the at least one second sequence of symbols.

18. The device of claim 17, wherein the defined first tone is a first pilot tone, and wherein at least one of the respective second tones is a second pilot tone.

19. The device of claim 18, wherein the first circuitry is further configured to encode a symbol of the first sequence of symbols according to a matrix element of an orthogonal matrix multiplied by a defined weight.

20. The device of claim 17, wherein the first circuitry selects the orthogonal matrix from a group including a P matrix and a Hadamard matrix, the device further comprising at least one memory device having first information indicative of the P matrix, second information indicative of the Hadamard matrix, and third information indicative of an orthogonal matrix.

21. The device of claim 19, wherein the defined weight is less than a second defined weight associated with a second symbol of the first sequence of symbols, the second symbol being configured to be transmitted earlier than the symbol.

* * * * *